(12) United States Patent
Shimizu et al.

(10) Patent No.: US 9,179,022 B2
(45) Date of Patent: Nov. 3, 2015

(54) OPERATION DISPLAY DEVICE, SCROLL DISPLAY CONTROLLING METHOD AND TANGIBLE COMPUTER-READABLE RECORDING MEDIUM

(75) Inventors: Hideaki Shimizu, Hachioji (JP); Yasuaki Sugimoto, Hachioji (JP); Takashi Kamada, Hino (JP); Takashi Kondo, Hachioji (JP)

(73) Assignee: KONICA MINOLTA BUSINESS TECHNOLOGIES, INC., Tokyo (JP)

( * ) Notice: Subject to any disclaimer, the term of this patent is extended or adjusted under 35 U.S.C. 154(b) by 150 days.

(21) Appl. No.: 13/455,580

(22) Filed: Apr. 25, 2012

(65) Prior Publication Data

US 2012/0274665 A1 Nov. 1, 2012

(30) Foreign Application Priority Data

Apr. 26, 2011 (JP) .................................. 2011-98799

(51) Int. Cl.
*G09G 5/00* (2006.01)
*H04N 1/00* (2006.01)
(Continued)

(52) U.S. Cl.
CPC .......... *H04N 1/00427* (2013.01); *G06F 3/0485* (2013.01); *G06F 3/04883* (2013.01); *H04N 1/00411* (2013.01); *H04N 1/00448* (2013.01); *H04N 1/00453* (2013.01); *H04N 1/00458* (2013.01); *H04N 1/00461* (2013.01);
(Continued)

(58) Field of Classification Search
CPC .............................. G06F 3/0481; G06F 3/0485
USPC ....................................................... 345/684
See application file for complete search history.

(56) References Cited

U.S. PATENT DOCUMENTS

| 7,551,188 | B2 * | 6/2009 | Ahokas | 345/684 |
| 2002/0027565 | A1 * | 3/2002 | Syukri | 345/684 |

(Continued)

FOREIGN PATENT DOCUMENTS

| JP | 2004-264990 A | 9/2004 |
| JP | 2006-236286 A | 9/2006 |

(Continued)

OTHER PUBLICATIONS

Japanese Office Action dated May 21, 2013 (and English translation thereof) in counterpart Japanese Application No. 2011-098799.

(Continued)

*Primary Examiner* — Xiao Wu
*Assistant Examiner* — Jitesh Patel
(74) *Attorney, Agent, or Firm* — Holtz, Holtz, Goodman & Chick PC

(57) ABSTRACT

Disclosed is an operation display device for carrying out a setting relating to an image forming device, including: a display device; an operating unit to receive an operation for starting a scroll display of a list in which a plurality of display items are listed, on a screen of the display device; and a control unit to control the scroll display so as to set a speed of the scroll display to a slow speed which is slower than a normal speed when the display item which satisfies a predetermined condition is displayed on the screen after the scroll display of the list is started by receiving the operation, wherein each display item has a plurality of attributes, and the control unit controls the scroll display in accordance with a satisfaction situation of the predetermined condition with respect to each of the plurality of attributes.

19 Claims, 35 Drawing Sheets

(51) Int. Cl.
 *G06F 3/0485* (2013.01)
 *G06F 3/0488* (2013.01)
 G09G 5/34 (2006.01)
 G06F 9/44 (2006.01)

(52) U.S. Cl.
 CPC .......... *G06F9/4443* (2013.01); *H04N 1/00204* (2013.01); *H04N 1/00244* (2013.01); *H04N 2201/0039* (2013.01); *H04N 2201/0094* (2013.01)

(56) References Cited

U.S. PATENT DOCUMENTS

| | | | |
|---|---|---|---|
| 2003/0043198 A1* | 3/2003 | Delpuch | 345/784 |
| 2005/0165740 A1* | 7/2005 | Kerr et al. | 707/3 |
| 2006/0215910 A1* | 9/2006 | Megawa | 382/176 |
| 2007/0296740 A1* | 12/2007 | Yu et al. | 345/684 |
| 2008/0077988 A1* | 3/2008 | Small | 726/22 |
| 2008/0155461 A1 | 6/2008 | Ozaki | |
| 2010/0306648 A1* | 12/2010 | Wilairat | 715/702 |
| 2011/0145737 A1* | 6/2011 | Laugwitz et al. | 715/763 |

FOREIGN PATENT DOCUMENTS

| | | |
|---|---|---|
| JP | 2008-135994 A | 6/2008 |
| JP | 2008-157974 A | 7/2008 |
| JP | 2009-129020 A | 6/2009 |
| JP | 2009-294526 A | 12/2009 |
| WO | WO 2007/037237 A1 | 4/2007 |

OTHER PUBLICATIONS

Chinese Office Action dated Jan. 30, 2014 (and English translation thereof) in counterpart Chinese Application No. 201210120568.8.
Japanese Office Action dated Feb. 12, 2014 (and English translation thereof) in counterpart Japanese Application No. 2011-098799.

* cited by examiner

FIG.12

| OUTPUT/UNOUTPUT IN CURRENT MODE | CONTROL |
|---|---|
| OUTPUT | NORMAL |
| UNOUTPUT | SLOWDOWN (FIRST SLOW MODE) |

| CURRENT \ OTHER | AT LEAST ONE "OUTPUT" IS INCLUDED | ALL "UNOUTPUT" |
|---|---|---|
| OUTPUT | NORMAL | NORMAL |
| UNOUTPUT | SLOWDOWN (FOURTH SLOW MODE) | LARGE SLOWDOWN (THIRD SLOW MODE) |

| FILE NAME | EXECUTION FUNCTION MODE ||| SCROLL ATTRIBUTE |
| | PRINT | FAX | Scan To Email | |
|---|---|---|---|---|
| ⋮ | ⋮ | ⋮ | ⋮ | ⋮ |
| AAAA.png | OUTPUT | OUTPUT | UNOUTPUT | NORMAL |
| B.jpg | OUTPUT | OUTPUT | UNOUTPUT | NORMAL |
| C.jpg | OUTPUT | UNOUTPUT | UNOUTPUT | SLOWDOWN |
| eaa.pdf | UNOUTPUT | UNOUTPUT | UNOUTPUT | STOP |
| fbb.png | UNOUTPUT | UNOUTPUT | UNOUTPUT | STOP |
| ⋮ | ⋮ | ⋮ | ⋮ | ⋮ |

| FILE NAME | EXECUTION FUNCTION MODE 720 ||| SCROLL ATTRIBUTE |
| --- | --- | --- | --- | --- |
| | PRINT | FAX | Scan To Email | |
| ⋮ | ⋮ | ⋮ | ⋮ | ⋮ |
| AAAA.png | OUTPUT | OUTPUT | UNOUTPUT | NORMAL |
| B.jpg | OUTPUT | OUTPUT | UNOUTPUT | NORMAL |
| C.jpg | OUTPUT | UNOUTPUT | UNOUTPUT | SLOWDOWN |
| eaa.pdf | UNOUTPUT | OUTPUT | UNOUTPUT | NORMAL |
| fbb.png | UNOUTPUT | UNOUTPUT | UNOUTPUT | STOP |
| ⋮ | ⋮ | ⋮ | ⋮ | ⋮ |

FIG.35

OPERATION DISPLAY DEVICE, SCROLL DISPLAY CONTROLLING METHOD AND TANGIBLE COMPUTER-READABLE RECORDING MEDIUM

BACKGROUND OF THE INVENTION

1. Field of the Invention

The present invention relates to an operation display device, a scroll display controlling method and a tangible computer-readable recording medium for displaying display items on a screen by scrolling the display area of the window (for carrying out the scroll display of the display items).

2. Description of Related Art

In recent years, it is known that a portable phone terminal or a portable terminal device has a function to start up application programs stored in the terminal or the device and to carry out the operation for files by operating the display screen while a user watches the display screen. As an example, the function referred to as the flick scroll for carrying out the scroll display of the display items relating to an electronic mail, the Internet, a game function or the like on the display screen of the portable phone terminal, by carrying out the flick operation for the display screen, is known.

Further, the following display control device for displaying thumbnail images based on the image data on a display unit, is known. In the display control device, the arrangement of the thumbnail images is determined by setting the order in which the thumbnail images are arranged on the display unit on the basis of the shooting date information or the shooting place information and the like attached to the image data. Then, the thumbnail images of which the scroll display is carried out are stopped in accordance with the definite change of the shooting date information or the shooting place information (See Japanese Patent Application Publication No. 2009-129020).

However, in case that when a user carries out the print or the facsimile transmission of a plurality of files or data stored in a USB (Universal Serial Bus) memory or stored in folders on a network by using an MFP (Multi-Function Peripheral), the process for the print or the facsimile transmission of some of the files or data has been carried out, the user does not know which file or data has been processed. It is troublesome for the user to find the file or data to be processed.

By applying the above-mentioned flick scroll, the user can carry out the scroll display of the display items on the screen and intuitively recognize the display items quickly. On the other hand, because the speed of the scroll display depends on the user's force for the flick operation, it is difficult to finely control the user's force for the flick operation in order to search the intended display item. That is, when the user excessively applies the force to the screen, the display area for the display items is scrolled at an overspeed. On the other hand, when the user's force is too little, the display area for the display items is only slightly scrolled and then the scroll display is stopped. Therefore, it is difficult to find out the intended display item from the screen. It was required to master the fine control of the force for the flick operation.

On the other hand, in the display control device disclosed in Japanese Patent Application Publication No. 2009-129020, the scroll display of the thumbnail window is stopped in accordance with the change of the predetermined condition, such as the shooting date or the shooting place. In this display control device, even though the user wants to search the intended display item, in case that the predetermined condition is changed, the scroll display is stopped. That is, even though the user continues to push an operation button for carrying out the scroll display, in case that the predetermined condition which is previously set is changed, the scroll display is stopped. Therefore, the above display control device was not suitable when the user searched the intended display item.

SUMMARY

To achieve at least one of the abovementioned objects, an operation display device reflecting one aspect of the present invention comprises:

a display device;

an operating unit to receive an operation for starting a scroll display of a list in which a plurality of display items are listed, on a screen of the display device; and a control unit to control the scroll display so as to set a speed of the scroll display to a slow speed which is slower than a normal speed when the display item which satisfies a predetermined condition is displayed on the screen after the scroll display of the list is started by receiving the operation, wherein each display item has a plurality of attributes, and the control unit controls the scroll display in accordance with a satisfaction situation of the predetermined condition with respect to each of the plurality of attributes.

Preferably, the control unit differentiates a control for the scroll display of the display item which fully satisfies the predetermined conditions, from a control for the scroll display of the display item which partially satisfies the predetermined conditions.

Preferably, the control unit stops the scroll display when the display item which fully satisfies the predetermined conditions is displayed on the screen, and the control unit sets the speed of the scroll display to the slow speed when the display item which partially satisfies the predetermined conditions is displayed on the screen.

Preferably, the control unit sets the speed of the scroll display to a first slow speed which is slower than the normal speed, when the display item which partially satisfies the predetermined conditions is displayed on the screen, and the control unit sets the speed of the scroll display to a second slow speed which is slower than the first slow speed, when the display item which fully satisfies the predetermined conditions is displayed on the screen.

Preferably, in the list, the display items for indicating files are listed, the operating unit receives a selection operation for selecting an output mode of the files among a plurality of output modes, the predetermined conditions include conditions that the file has been already output or is still not output in each of the output modes, and the display item which partially satisfies the predetermined conditions is a display item in which the file is still not output in the selected output mode and the file has been already output in at least one of the other output modes, or a display item in which the file has been already output in the selected output mode and the file is not still output in at least one of the other output modes.

Preferably, when the display item which fully satisfies the predetermined conditions is displayed on the screen, the control unit controls the scroll display.

Preferably, in the list, the display items for indicating files are listed, an output mode of the files is selectable among a plurality of output modes, and the predetermined conditions include a combination of conditions that the file has been already output or is still not output in the respective output modes.

Preferably, the operation for starting the scroll display is a flick operation in which a user flicks the screen with a user's finger.

Preferably, the operating unit receives a setting operation for setting a speed control position in the screen, and the control unit stops the scroll display or sets the speed of the scroll display to the slow speed when the display item which satisfies the predetermined condition reaches the speed control position.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 12 is an explanatory view showing the scroll attribute determination table in case of the second pattern ((Setting A) single determination+(Setting C) slowdown mode);

FIG. 14 is an explanatory view showing the scroll attribute determination table in case of the sixth pattern ((Setting A) multiple determination+(Setting B) two-step control+(Setting C) slowdown mode);

FIG. 29 is an explanatory view showing the unprocessed file management table in the situation shown in FIG. 28;

FIG. 33 is an explanatory view showing the unprocessed file management table in case that file "eaa.pdf" has been transmitted in the facsimile mode;

FIG. 35 is an explanatory view showing an example of the job history window which is the list window showing the print history of the image processing device.

DETAILED DESCRIPTION OF PREFERRED EMBODIMENT

Hereinafter, a preferred embodiment of the present invention will be explained with reference to the accompanying drawings.

Figure 1:
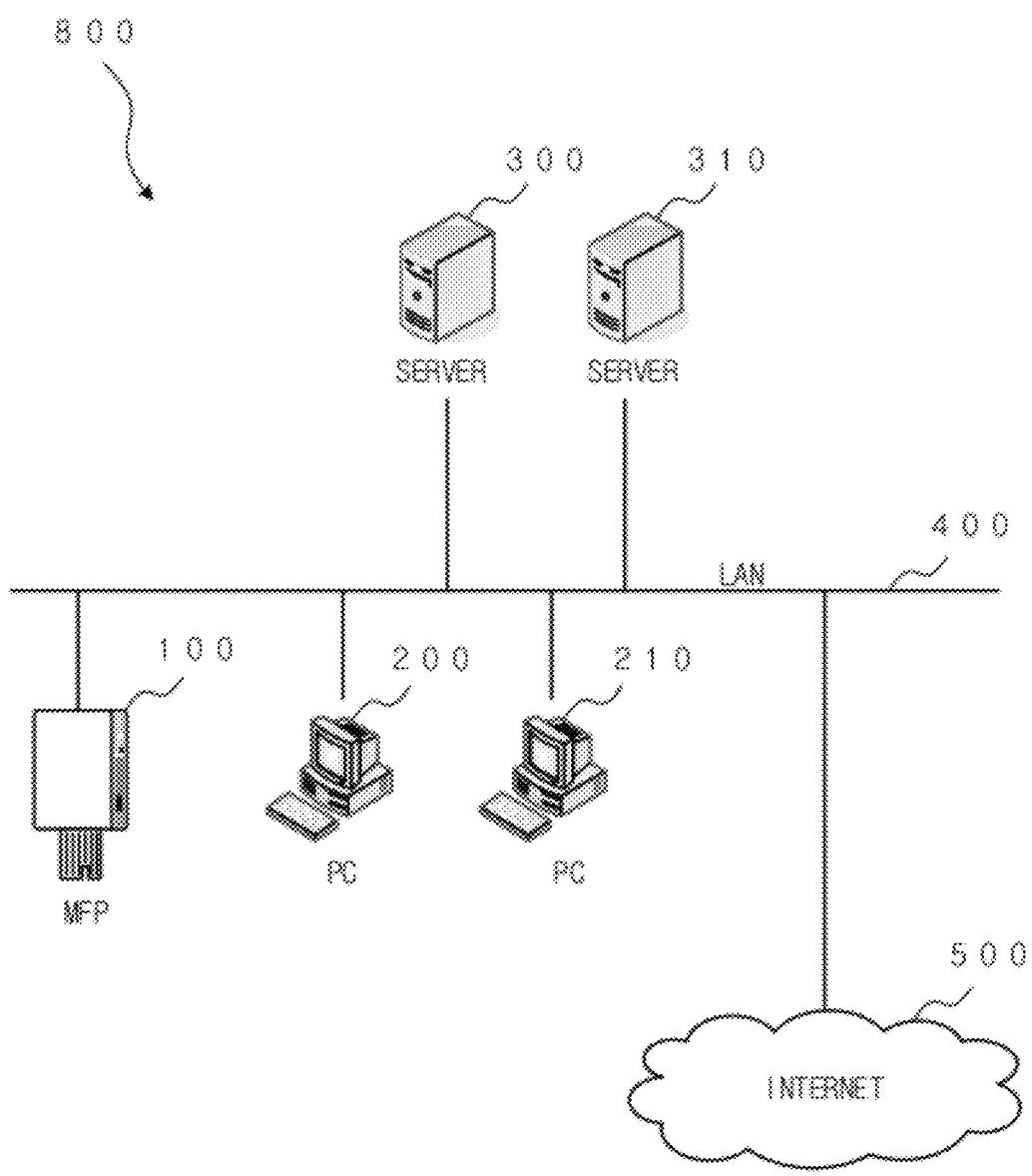
FIG. 1 is a configuration diagram of the whole network system according to the embodiment.

FIG. 1 shows an example of the configuration diagram of the whole network system 800 according to the embodiment. The network system 800 comprises an image processing device (MFP) 100 which is an image forming device, an information processing device (PC) 200, an information processing device (PC) 210, a server 300 and a server 310, which are connected via a LAN (Local Area Network) 400. Further, the network system 800 is connected with the Internet 500 via the LAN 400.

The image processing device 100 has a function to execute print processes by receiving print jobs from the information processing device 200, the information processing device 210 and the like. Further, the image processing device 100 has a function to execute the copy and the FAX communication by receiving copy jobs and FAX jobs. For example, in case that the image processing device 100 receives a copy job, the image processing device 100 obtains an image data by reading the predetermined original and prints out the image data on print paper. In case that the image processing device 100 receives a FAX job, the image processing device 100 transmits an image data to the designated facsimile device via a telephone line or the image processing device 100 receives an image data from another facsimile device. In this specification, the term "FAX" is a generic term of the facsimile communication (transmission/reception) carried out by the facsimile.

The information processing device 200 and the information processing device 210 are personal computers used by users. Each of the server 300 and the server 310 is, for example, a mail server for managing electronic mails transmitted to the information processing device 200, an Internet server connected to the Internet 500 by using the communication protocol referred to as TCP/IP (Transmission Control Protocol/Internet Protocol), or the like.

Figure 2:
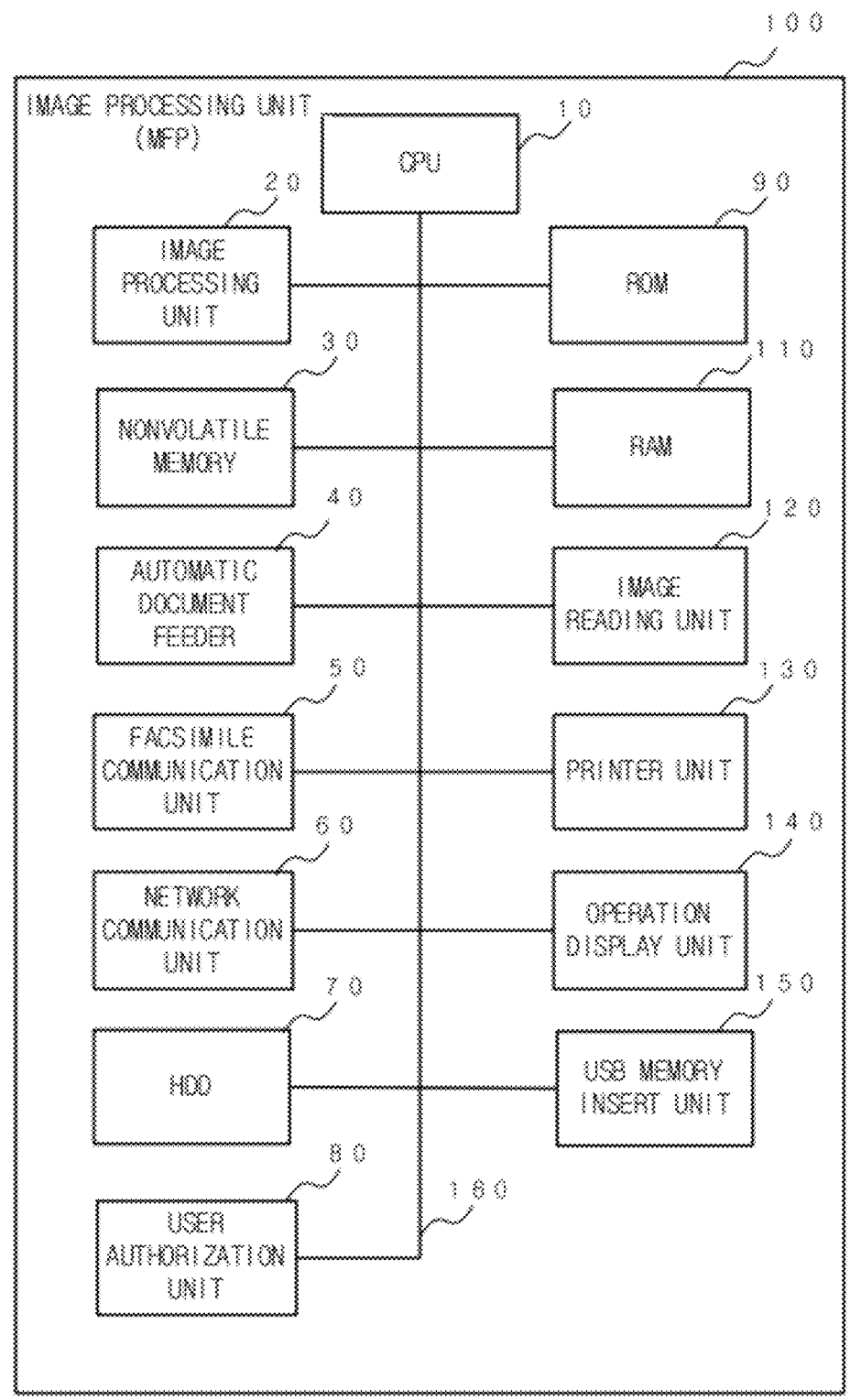
FIG. 2 is a block diagram of the image processing device.

FIG. 2 shows a block diagram of the image processing device 100. The image processing device 100 shown in FIG. 2 comprises a CPU (Central Processing Unit) 10 which controls the whole operation of the image processing device 100 and executes various types of jobs, an image processing unit 20, a nonvolatile memory 30, an automatic document feeder 40, a facsimile communication unit 50, a network communication unit 60, an HDD (Hard Disk Drive) 70, a user authorization unit 80, a ROM (Read Only Memory) 90, a RAM (Random Access Memory) 110, an image reading unit 120, a printer unit 130, an operation display unit 140 and a USB memory insert unit 150. The CPU 10 is connected with all of the above elements via an internal bus 160.

Further, the CPU 10 has a function as a control unit of the operation display device for carrying out a setting relating to the image processing device 100. The CPU 10 instructs the display unit of the operation display unit 140 to display the list in which a plurality of display items are listed. The term "display item" means an indication for specifying a file, data, a job history or the like, such as a thumbnail, an icon, a mark, a file name, a data name or the combination thereof which corresponds to the item, such as the file, the data (for example, the file or data to be printed) or the job history, and the display item is displayed in the list control in the screen of the display unit. The CPU 10 instructs the display unit of the operation display unit 140 to start the scroll display of the list in accordance with the starting operation for starting the scroll display, which is received by the operating unit of the operation display unit 140.

The image processing unit 20 is controlled by the CPU 10. For example, the image processing unit 20 carries out the rasterization processing for converting print data into image data, compression/decompression processing of image data and the like, in addition to the processings, such as enlargement/reduction and rotation of the image.

The nonvolatile memory 30 is a memory (flash memory) in which the stored contents are not damaged even if the image forming image device 20 is turned off.

The automatic document feeder (ADF) 40 conveys the original set to the original feed tray sheet by sheet and passes the original on a platen glass to make the image reading unit 120 read the image. Then, the automatic document feeder 40 discharges the original to the original discharge tray.

The facsimile communication unit 50 transmits and receives the document data, the image data prepared by the PC or the like via the public line network (telephone line network). The network communication unit 60 transmits and receives various types of data to/from external devices, such as the information processing device 200, the information processing device 210, the server 300, the server 310 or the like via the LAN 400.

The HDD 70 is a large-capacity nonvolatile memory device, and is used for storing, for example, print data, image data, an output situation management table (which is explained in later) for indicating the output situation of various files, and the like.

The user authorization unit 80 is a processing unit for authorizing the user who logs in the image processing unit 100. The user authorization unit 80 carries out the user authorization in accordance with the enter information, such as a user ID (Identification) and a password which are entered via the operation display unit 140. For example, in the HDD 70, the user information is previously stored with respect to each user. When the user authorization is carried out, the user authorization unit 80 reads out the user information stored in the HDD 70, and judges whether the user ID and the password which are entered via the operation display unit 140 are coincident with the user information. Then, in case that the user is identified, the user authorization is successful. The image processing device 100 transits the login state in which the user is treated as a login user.

In ROM 90, various types of programs are stored. The CPU 10 executes the processes in accordance with these programs. As a result, various types of functions of the image processing device 100, such as the execution of jobs, are realized. The RAM 110 is used as a work memory for temporarily storing various data when the CPU 10 executes the programs and as an image memory for storing image data.

The image reading unit 120 has a function to obtain the image data by optically reading the original conveyed from the automatic document feeder 40. For example, the image reading unit 120 comprises a light source for irradiating the original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The printer unit 130 has a function to form an image on print paper in accordance with the image data. In the present embodiment, the printer unit 130 is configured as the so-called laser printer for forming the image by the electrophotographic process. The laser printer comprises a photoconductive drum, a charging device, a laser unit, a developing device, a transfer device, a separation device, a cleaning device and a fixing unit. In the printer unit 130, other types may be adopted.

The operation display unit 140 comprises a display unit and an operating unit. The display unit comprises a liquid crystal display (LCD) or the like, and has a function to display various types of operation windows, setting windows and the like. Further, the display unit has a function as a display device of the operation display device, for displaying the list in which the display items are listed. The operating unit has a function to receive various types of operations, such as the jobs or the settings from the user. Further, the operating unit has a function as an operating unit of the operation display device, for receiving the operation for starting the scroll display of the list on the screen of the display unit. The operating unit comprises a touch panel which is provided on the screen of the display unit. The touch panel is used for selecting the display item displayed on the display unit and detects a coordinate position in which the user pushes down. Further, the operating unit comprises a numerical keypad, an alphabetical keypad, a start key and the like.

The USB memory insert unit 150 is an insert port for inserting a USB memory into the image processing device 100. When the USB memory is inserted in the USB memory insert unit 150, the CPU 10 recognizes that the USB memory is inserted.

<Schematic Explanation of the Embodiment>

In the embodiment, when the user carries out the flick operation on the operation display unit 140, the CPU 10 instructs the operation display unit 140 to carry out the scroll display of the display items (indicating the file or data) which are displayed on the operation display unit 140. Then, when the display item which satisfies the predetermined search condition (also referred to simply as "condition") is displayed on the operation display unit 140, the CPU 10 controls the scroll display so as to stop the scroll display or to set the speed of the scroll display to a slow speed which is slower than a normal speed.

Specifically, the user connects the USB memory to the image processing device 100 when the file or the data stored in the USB memory is printed out. After the USB memory is connected to the image processing device 100, the files or the data to be printed are displayed as the display items on the operation display unit 140 of the image processing device 100.

The user can select the execution function mode for the displayed files or data, that is, the function relating to the output of the files or data, such as print, facsimile transmission and the like. The execution function mode which is currently selected by the user is referred to as the current mode. The flick operation is one operation which is carried out on the operation display unit 140, and is the operation in which the user slides the screen on which the display items are displayed in the state that the user's finger contacts to the screen. That is, the flick operation is the operation in which the user flicks the screen with a user's finger. Specifically, the flick operation is the operation in which the user's finger touches the operation display unit 140 so as to the finger rapidly flicks it.

Figure 27:
FIG. 27 is an explanatory view showing the unprocessed file management table read out from the HDD.

The image processing device 100 comprises an output situation management table in which the execution results (execution history) of each file stored in the USB memory are registered with respect to each execution function mode, in the HDD 70. The execution results include results that the file or the like is already output (output) or is not still output (unoutput) and results that the output of the file or the like is successful (success) or is failed (failure). In this embodiment, there are an output/unoutput mode for managing the results of each file according to "output" or "unoutput" and a success/failure mode for managing the results of each file according to "success" or "failure". For example, in case of the output/unoutput mode for managing the results of each file according to "output" or "unoutput", the output situation management table is the unprocessed file management table 700 as shown in FIG. 27. The output/unoutput mode and the success/failure mode are collectively referred to as the management mode.

In the unprocessed file management table 700 shown in FIG. 27, with respect to three execution function modes (also referred to as "output mode", in the present embodiment, the print mode, the FAX mode and the Scan To Email mode) which are provided in the image processing device 100, the execution results of each file stored in the USB memory are managed. As an example, in the unprocessed file management table 700, five files (AAAA.png, B.jpg, C.jpg, eaa.pdf and fbb.png), the execution results of the above files and the scroll attributes thereof are managed. The scroll attribute is an attribute indicating the control for the scroll display, which is carried out when the thumbnail (display item) corresponding to the file (item) reaches the control standard position (also referred to as "speed control position") which is previously set on the operation display unit 140. In the present embodiment, the scroll attributes include "stop", "slowdown", "large slowdown", "normal" and the like. The attribute "normal" indicates that the scroll display of the display item is normally carried out without stopping or slowing down the scroll display in accordance with the execution results of the file. Hereinafter, the above scroll display is also referred to as the normal scroll display. In FIG. 27, the scroll attributes "stop", "slowdown" and "normal" are described with respect to each file (item). The scroll attribute is determined in accordance with the execution results of the file. The method for determining the scroll attribute will be explained later.

The user selects the execution function mode (current mode). Next, the user carries out the flick operation on the operation display unit 140 in order to search the file to be printed. By the flick operation of the user, the scroll display of the display items (thumbnails) corresponding to the files (items) is carried out on the operation display unit 140. Then, the scroll display of each display item is carried out on the operation display unit 140 in accordance with the determined scroll attribute.

Figure 26:
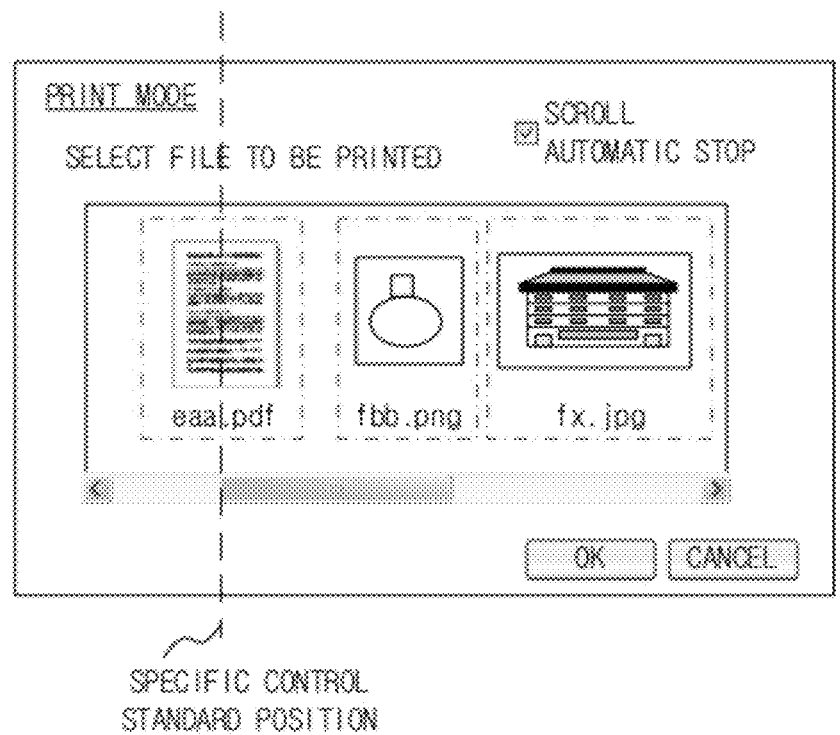
FIG. 26 is an explanatory view showing the situation in which the scroll display is quickly stopped when the thumbnail (display item) having a file name as "eaa.pdf" reaches the specific control standard position.

For example, the scroll attribute of "eaa.pdf" shown in FIG. 27 is "stop". Therefore, when the display item (thumbnail) of the "eaa.pdf" reaches the predetermined control standard position in the screen, the scroll display is stopped as shown in FIG. 26. As described above, when the display item corresponding to the item reaches the control standard position on the operation display unit 140, the scroll display is controlled, for example, is stopped, is slowed, or is normally carried out, in accordance with the scroll attribute of the item.

Further, the user can previously set the control standard position (hereinafter, also referred to as specific control standard position) of the scroll display. On the screen of the operation display unit 140, the list control which is an area for carrying out the scroll display of the display items is provided. The list control has an area enough to display the predetermined number of the display items at one time. The user can set the specific control standard position to an optional position in the list control.

For example, in case that three display items are displayed in the list control at one time, the list control is divided into three areas, and the specific control standard position is set to the middle position of anyone of the divided three areas. The method for setting the specific control standard position includes the first method in which the above position is selected among the preset positions (for example, three positions, such as a left area, a middle area and a right area of the list control), and the second method in which the position (coordinate) that the flick operation is started is set to the specific control standard position. In the second method, the area including the position (coordinate) that the flick operation is started is specified among three areas into which the whole list control is divided in the scroll direction, and the middle position of the specified area is determined as the specific control standard position.

<Whole Operation of the Image Processing Device 100>

Next, the whole operation of the image processing device 100 according to the present embodiment, which is carried out in case that the process such as the print of the file stored in the USB memory is executed, will be explained.

Figure 3:
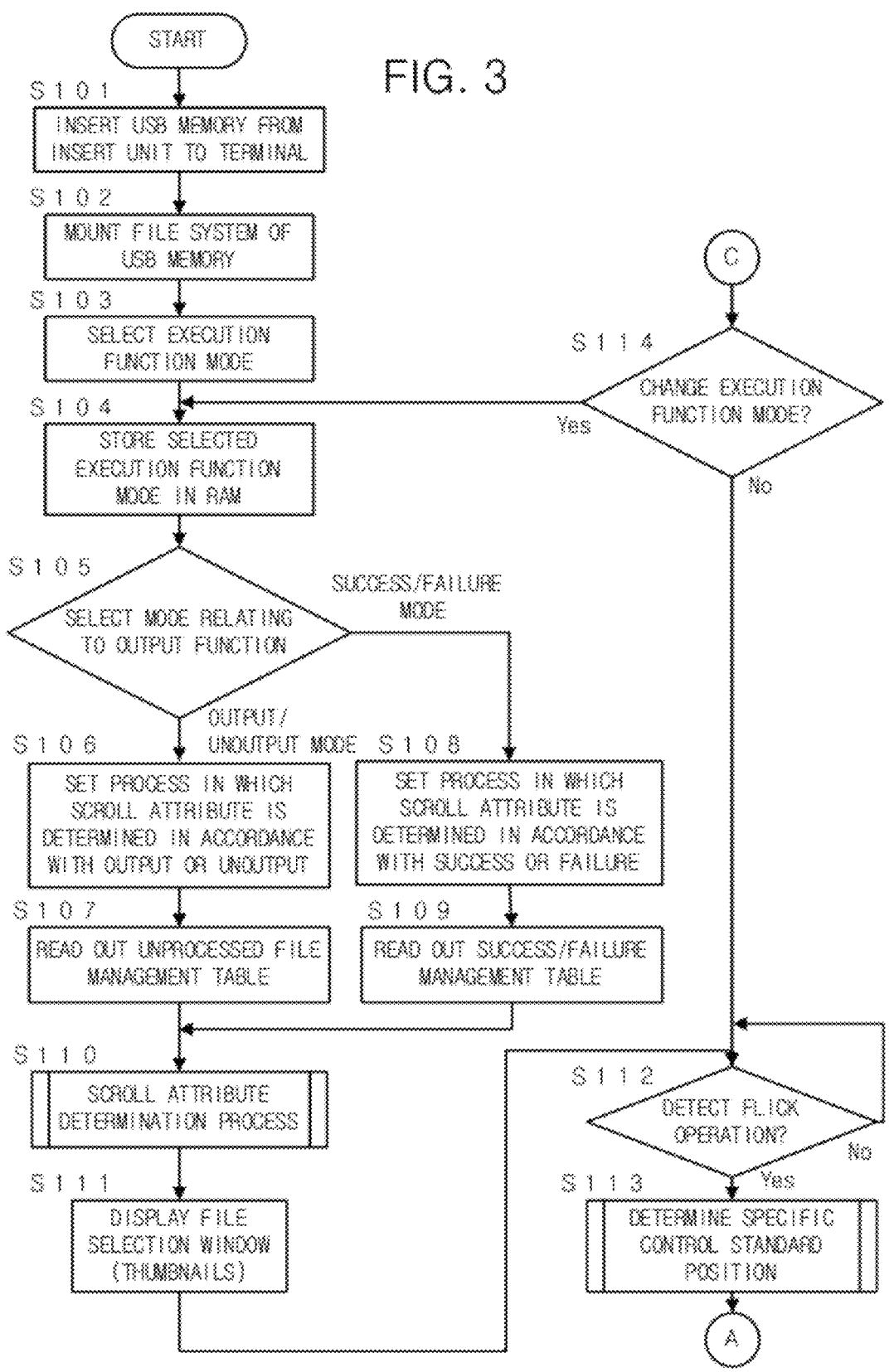
FIG. 3 is a flowchart showing the preparation process until the starting of the scroll display.
Figure 4:
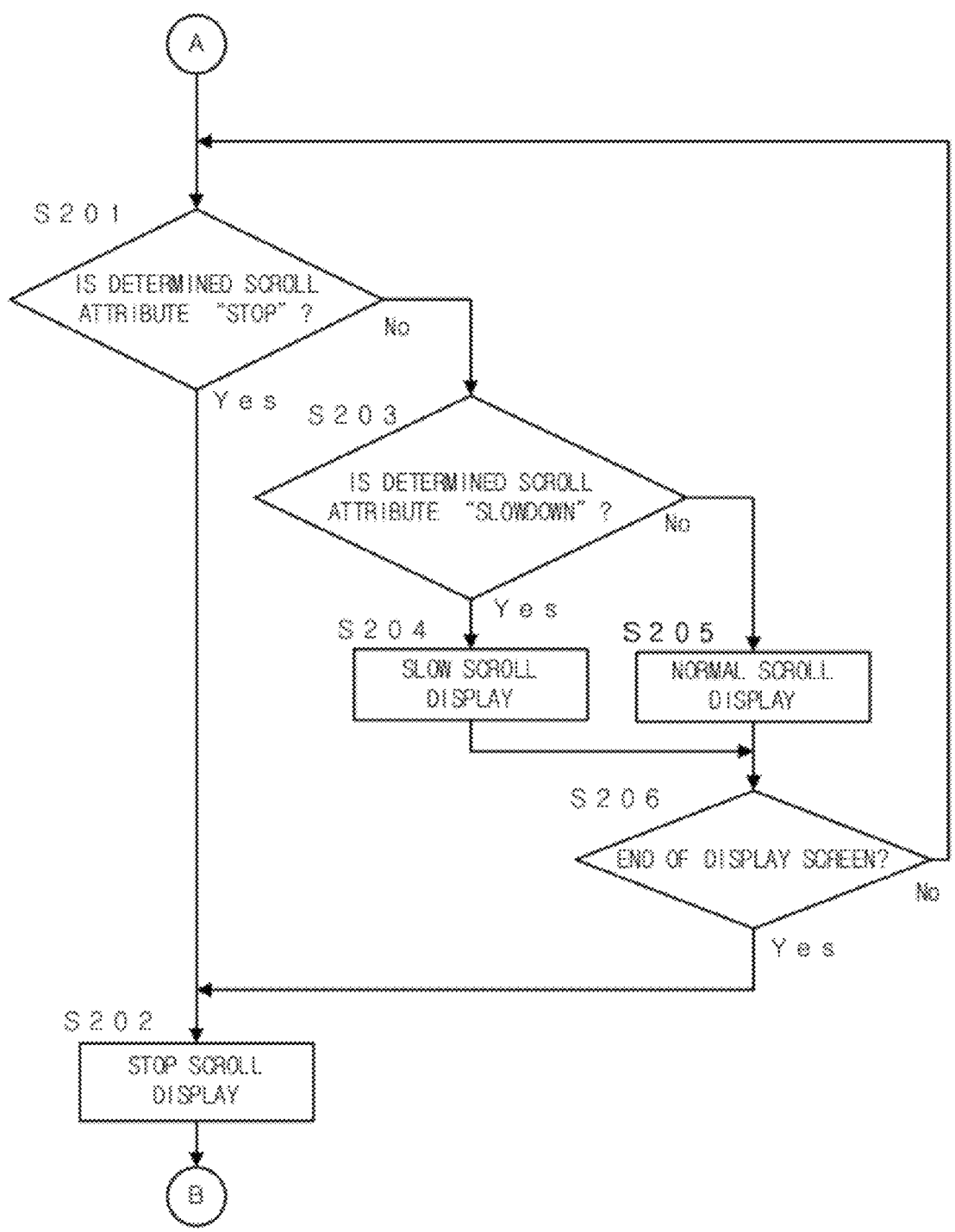
FIG. 4 is a flowchart showing the stop process for the scroll display in accordance with the scroll attributes, which follows the flowchart connector A of FIG. 3.
Figure 5:
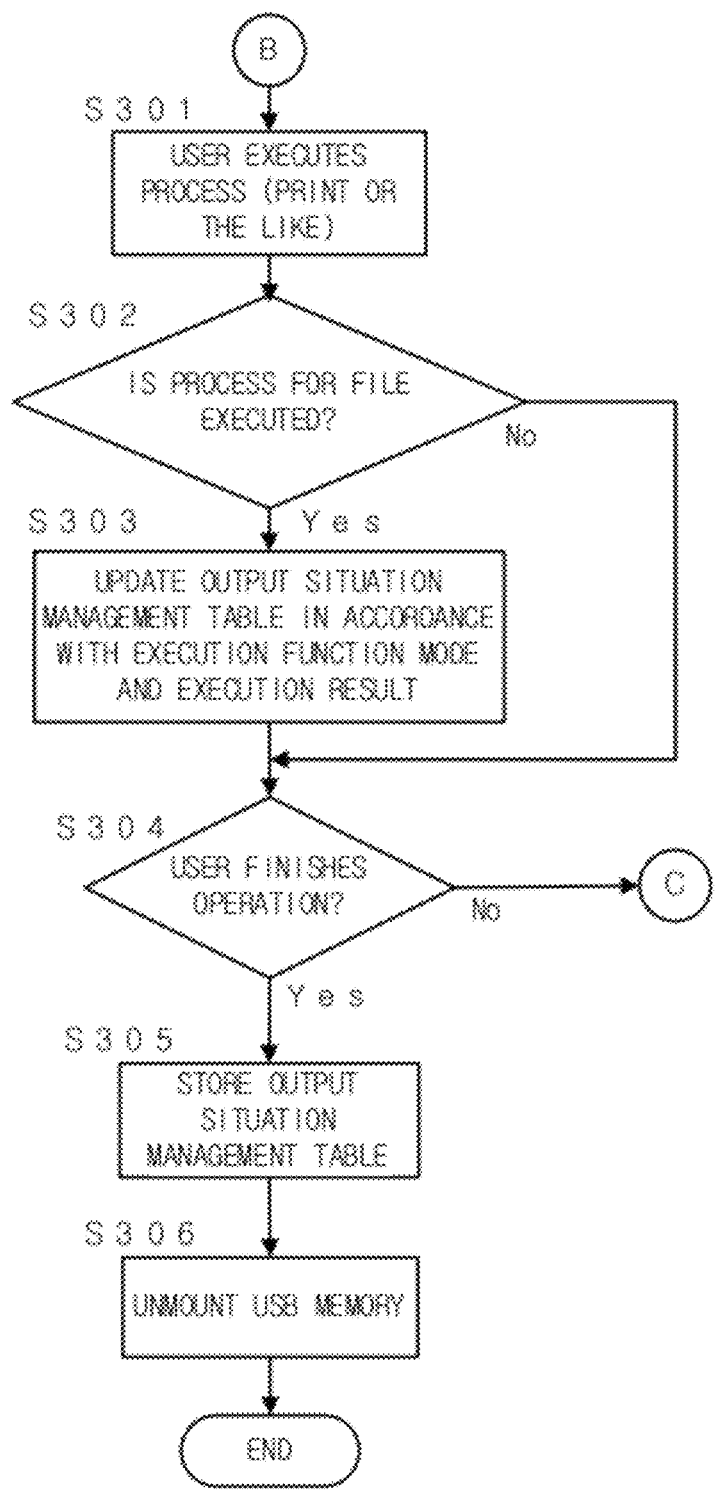
FIG. 5 is a flowchart showing the process after the scroll display is stopped in Step S202, which follows the flowchart connector B of FIG. 4.

FIGS. 3 to 5 show the above whole operation. The CPU 10 executes the process shown in FIGS. 3 to 5 in accordance with the programs stored in the ROM 90.

<Preparation Process Until the Starting of the Scroll Display>

FIG. 3 shows the flowchart of the preparation process until the starting of the scroll display. When the USB memory is inserted into the USB memory insert unit 150 by the user, the image processing device 100 detects the USB memory connected to the USB connection terminal (Step S101).

When the CPU 10 detects the connected USB memory, the CPU 10 mounts the file system for the USB memory on the system field of the image processing device 100 (Step S102). That is, the CPU 10 carries out the process for making the OS of the image processing device 100 recognize the files stored in the USB memory.

Next, the CPU 10 receives the selection operation of the execution function mode for the file stored in the USB memory from the user (Step S103). The execution function modes include, for example, the print mode, the FAX mode, the Scan To Email mode and the like. The user selects one optional execution function mode from these modes. Then, the CPU 10 stores the selected execution function mode (current mode) in the RAM 110 (Step S104).

The CPU 10 determines whether the management mode of the execution results is set to the output/unoutput mode or the success/failure mode (Step S105). The management mode of the execution results may be previously set and registered, or the CPU 10 may receive the selection operation of the management mode from the user at this time.

In case that the output/unoutput mode is selected as the management mode of the execution results (Step S105; output/unoutput mode), the CPU 10 registers the process in which the scroll attribute is determined in accordance with the "output" or the "unoutput" (output/unoutput) in each execution function mode (Step S106). The CPU 10 reads out the unprocessed file management table 700 corresponding to the connected USB memory from the HDD 70 (Step S107). Then the process proceeds to Step S110.

In case that the success/failure mode is selected as the management mode of the execution results (Step S105; success/failure mode), the CPU 10 registers the process in which the scroll attribute is determined in accordance with the success/failure in each execution function mode (Step S108). The CPU 10 reads out the success/failure management table corresponding to the connected USB memory from the HDD 70 (Step S109). Then the process proceeds to Step S110.

The success/failure mode is a mode for recording and managing the execution results in which after the output process is started, the output process is successful or failed. For example, the "failure" of the execution result in case that the execution function mode is the print mode, indicates that the print process has not been finished because of the failure of the print process (paper-out, paper jam, or the like). The success/failure management table has the same format as the unprocessed file management table 700 shown in FIG. 27. In the success/failure management table, the "failure" or "success" is registered instead of "output" or "unoutput".

Next, the CPU 10 determines the scroll attributes for all of the items (files) registered in the unprocessed file management table 700 or the success/failure management table in accordance with the execution results in each execution function mode for the item (Step S110). That is, the CPU 10 determines that the scroll attribute for carrying out the control for the scroll display of the list depending on how much the execution results of the item (file) in one or more execution function modes (one or more attributes of the display item) satisfy the predetermined conditions (in accordance with the satisfaction situation of the predetermined conditions for the above the attributes of the display item). In the following case, the output/unoutput mode is set and the scroll display is controlled in accordance with the unprocessed file management table 700.

For example, in the unprocessed file management table 700 shown in FIG. 27, the column of the scroll attribute is provided next to the column of the execution function mode. The CPU 10 sets the scroll attribute of each item to "stop", "slowdown", "normal" or the like in accordance with the current mode selected by the user. The scroll attribute determination process will be explained in later.

When the CPU 10 determines the scroll attributes for all of the items (files), the operation display unit 140 displays the file selection window (thumbnail display window) corresponding to the items stored in the USB memory (Step S111). The file selection window is a window (for example, FIG. 25) having the above described list control. In the window, the predetermined number of the thumbnail images (in this example, three thumbnail images) of the items (files) can be displayed in the situation that the thumbnail images are stopped. Further, in the list control, the scroll display of the thumbnail images can be carried out. The displayed contents of each thumbnail image are determined in accordance with the kind and the contents of each file or data.

When the flick operation carried out by the user on the operation display unit 140 is detected (Step S112; Yes), the CPU 10 starts the scroll display of the display items (thumbnails) on the operation display unit 140. Further, the CPU 10 determines the specific control standard position (Step S113). In this example, the specific control standard position is determined among the right area, the middle area or the left area of the screen, in which the flick operation is started.

<Stop Operation for the Scroll Display in Accordance with the Scroll Attribute>

FIG. 4 shows the stop process for the scroll display in accordance with the scroll attributes, which follows the flowchart connector A of FIG. 3. In the following explanation, before Step S201, the scroll display of the display items (thumbnails) is carried out on the operation display unit 140 by the flick operation which is carried out by the user in Step S112.

The CPU 10 judges that the scroll attribute of the display item which will be displayed in the specific control standard position determined in Step S113 of FIG. 3, when the display item moves just before the specific control standard position. Specifically, the scroll attribute of the display item following the display item which is currently positioned in the specific control standard position, is judged. Further, the CPU 10 judges the scroll attribute of each display item (that is, each thumbnail) of which the scroll display is carried out on the operation display unit 140.

The CPU 10 judges the scroll attribute of the display item which is positioned just before the specific control standard position. When the scroll attribute is "stop" (Step S201; Yes), the scroll display is stopped at the timing at which the display item reaches the specific control standard position (Step S202). On the other hand, when the scroll attribute is "slowdown" (Step S201; No and Step S203; Yes), the scroll display is slowed down at the timing at which the display item reaches the specific control standard position (Step S204). Then, the process proceeds to Step S206. When the scroll attribute is "normal" (Step S201; No and Step S203; No), the CPU 10 carries out the scroll display of the display item at the normal speed and pass the display item through the specific control standard position (Step S205). Then, the process proceeds to Step S206.

In the Step S206, the CPU 10 checks whether the last display item of the display items of which the scroll display is carried out, reaches the end of the operation display unit 140 in the scroll direction. When the last display item reaches the end of the operation display unit 140 (Step S206; Yes), the CPU 10 stops the scroll display (Step S202). When the last display item does not reach the end of the operation display unit 140 (Step S206; No), the process returns to Step S201 and continues. That is, the CPU 10 judges the scroll attribute of the display item following the display item which is positioned in the specific control standard position and determines the stop operation or the like of the scroll display (Steps S201 to S205).

During the scroll display, in case that the user carries out the stop operation for the scroll display, the scroll display is stopped at this time. For example, when the scroll display is slowed down, the user can confirm the contents of the display items and stop the scroll display by carrying out the stop operation, if necessary. For example, when the user pushes down an optional portion of the operation display unit 140 or the display item with the user's finger, the CPU 10 stops the scroll display.

<Process after the Scroll Display is Stopped>

FIG. 5 shows the process after the scroll display is stopped in Step S202, which follows the flowchart connector B of FIG. 4. Before Step S301, the scroll display is stopped on the operation display unit 140 in Step S202 of FIG. 4. The user confirms the display items on the operation display unit 140 and instructs the image processing device 100 to execute the output process in the current mode, such as the print mode, the FAX mode or the like, if necessary (Step S301).

The CPU 10 checks whether the output process for the file is executed. For example, in case that the print process for an optional item (file) is executed by using the printer unit 130 (Step S302; Yes), the CPU 10 registers the execute function mode and the execution result to the output situation management table (in the embodiment, the unprocessed file management table shown in FIG. 27) read out in Step S107 of FIG. 1, and updates the table (Step S303).

The CPU 10 judges whether the user finishes the selection operation for the display item (thumbnail) in the file selection window (Step S304). In case that the operation for finishing the selection operation in the file selection window is not received from the user (Step S304; No), the process returns to the flowchart connection C of FIG. 3. Then, the CPU 10 judges whether the change operation for changing the execution function mode is received (Step S114). In case that the execution function mode is not changed (Step S114; No), the process following Step S112 of FIG. 3 is executed. On the other hand, in case that the execution function mode is changed (Step S114; Yes), the process returns to Step S104 and the following the process is executed.

In case that the operation for finishing the selection operation in the file selection window is received from the user (Step S304; Yes), the CPU 10 stores the output situation management table (for example, FIG. 27) read out in Step S107 of FIG. 1 and updated in Step S303, in the HDD 70 (Step S305). Further, the CPU 10 releases the mount of the USB memory (unmounts the USB memory) (Step S306). Then the process is ended (End).

Next, the scroll attribute determination process in Step S110 of FIG. 3 will be explained.

<Summary of the Scroll Attribute>

In the present embodiment, the scroll attribute is determined in accordance with the setting values of the following settings A to C. In detail, in accordance with the settings A to C, one pattern is selected among the first pattern to the sixth pattern, which are explained later, as the method for determining the scroll attribute. Further, in accordance with the selected pattern, the scroll attribute is determined.

First, the settings A to C are explained as follows.

(Setting A)

The setting A has two setting values (options) of "single determination" and "multiple determination". In the "single determination", the scroll attribute is determined in accordance with only the execution result of the currently selected execution function mode (current mode). In the "multiple determination", the scroll attribute is determined in accordance with both of the execution result of the current mode and the execution results of other execution function modes (other modes).

(Setting B)

The setting B is effective when the "multiple determination" is set as the setting value of the setting A. The setting B has two setting values of "one-step control" and "two-step control". In the "one-step control", the control for the scroll display ("stop", "slowdown" or the like), which is different from the normal control, is carried out only when the execution results of all of the execution function modes satisfy the predetermined conditions. In the "two-step control", the control which is different from the normal control, is carried out when the execution result of at least one execution function mode satisfies the corresponding condition. Further, the control which is carried out when the execution results of all of the execution function modes satisfy the predetermined conditions, is different from the control which is carried out when the execution result of at least one execution function mode satisfies the corresponding condition.

(Setting C)

The setting C has two setting values of "slowdown mode" and "stop mode". In the "slowdown mode", the control which is different from the normal control is carried out, however, the scroll display is not stopped (the scroll display is controlled so as to only slow down the scroll display). In the "stop mode", the control which is different from the normal control is carried out, further, the scroll display is stopped (the scroll display is controlled so as to only stop it or so as to stop and slow down it).

The method for determining the scroll attribute is set in accordance with the setting values of the above-described settings A to C.

(First Pattern)

When the "single determination" is set (selected) in the setting A and the "stop mode" is set in the setting C, the method for determining the scroll attribute is set to the first pattern. Hereinafter, the above combination of the settings is referred to as "(Setting A) single determination+(Setting C) stop mode".

The setting B is effective when the "multiple determination" is set in the setting A. Therefore, in case of "(Setting A) single determination+(Setting C) stop mode", the method for determining the scroll attribute is set to the first pattern without depending on the setting value of the setting B. The method for determining the scroll attribute in each pattern will be explained later.

(Second Pattern)

In case of "(Setting A) single determination+(Setting C) slowdown mode)", the method for determining the scroll attribute is set to the second pattern. Further, in case of "(Setting A) single determination+(Setting C) slowdown mode)", the method for determining the scroll attribute is set to the second pattern without depending on the setting value of the setting B, like the first pattern.

(Third Pattern)

In case of "(Setting A) multiple determination+(Setting B) one-step control+(Setting C) stop mode", the method for determining the scroll attribute is set to the third pattern.

(Fourth Pattern)

In case of "(Setting A) multiple determination+(Setting B) one-step control+(Setting C) slowdown mode)", the method for determining the scroll attribute is set to the fourth pattern.

(Fifth Pattern)

I case of "(Setting A) multiple determination+(Setting B) two-step control+(Setting C) stop mode", the method for determining the scroll attribute is set to the fifth pattern.

(Sixth Pattern)

In case of (Setting A) multiple determination+(Setting B) two-step control+(Setting C) slowdown mode, the method for determining the scroll attribute is set to the sixth pattern.

The user can previously select the setting values of above settings A to C. The selection results are registered in the nonvolatile memory 30 or the like. In the scroll attribute determination process, in accordance with the selected setting values of the above settings A to C, the pattern to be used is determined among the first to sixth patterns. In accordance with the determined pattern, the scroll attribute of each item is determined. Each of the six patterns will be explained as follows.

<First Pattern>

Figure 7:
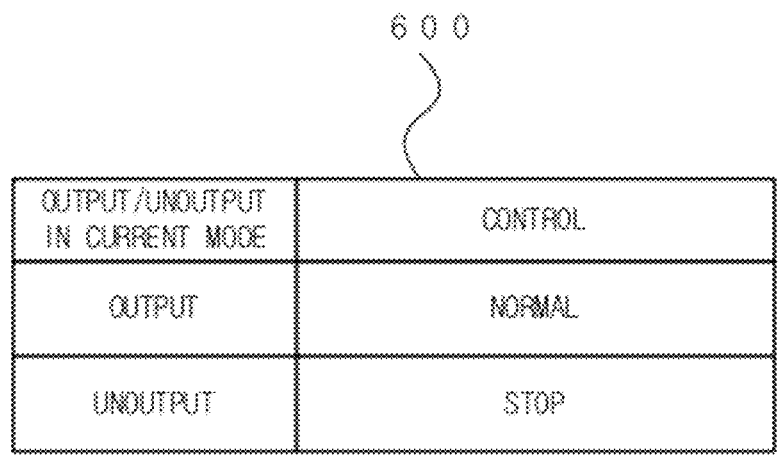
FIG. 7 is an explanatory view showing the scroll attribute determination table in case of the first pattern ((Setting A) single determination+(Setting C) stop mode)
Figure 8:
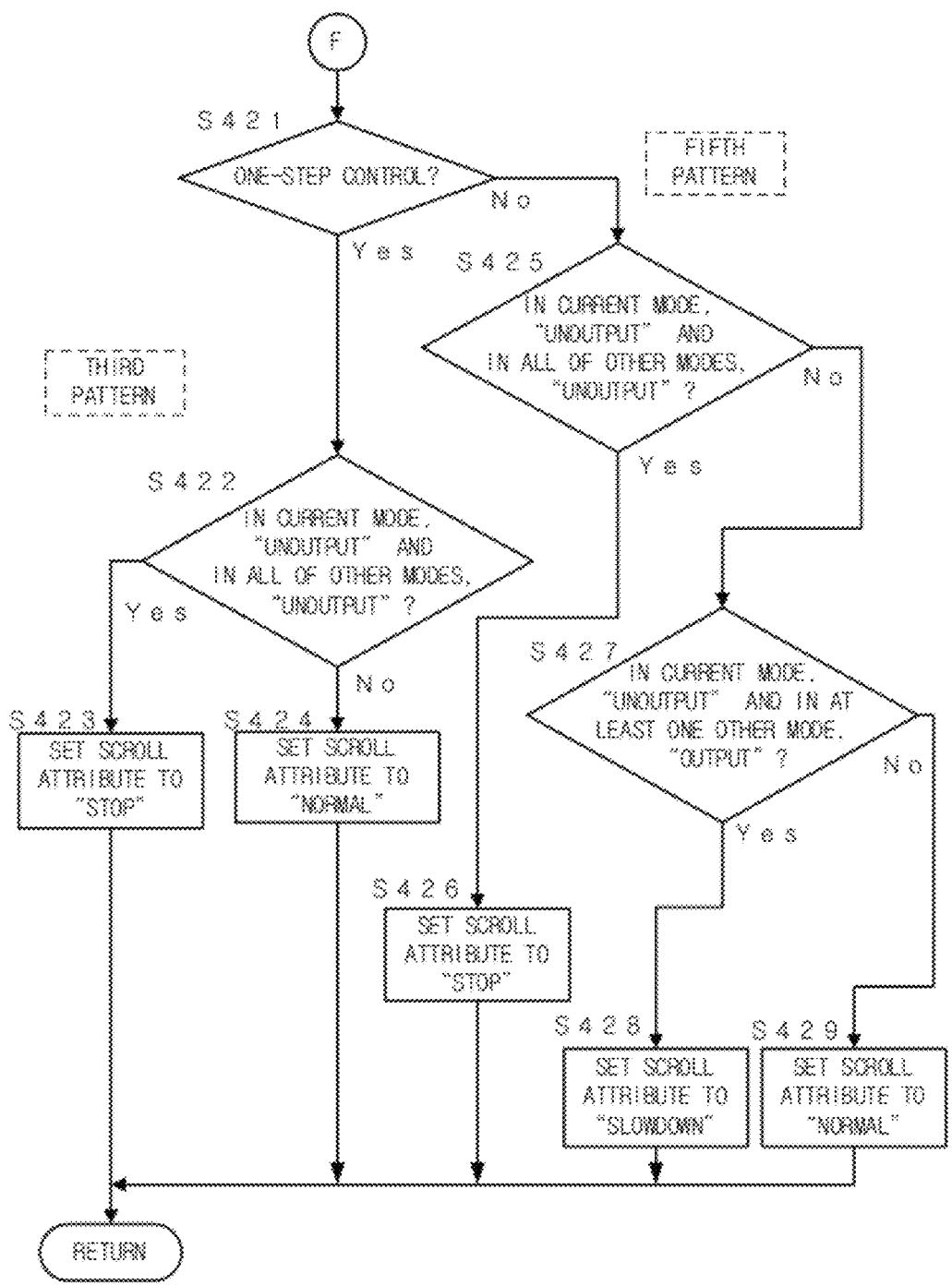
FIG. 8 is a flowchart showing the scroll attribute determination process, which follows the flowchart connector F of FIG. 6.

FIG. 7 shows the scroll attribute determination table 600 in case of the first pattern ((Setting A) single determination +(Setting C) stop mode). The scroll attribute determination table 600 shown in FIG. 7 has a column of "output/unoutput in current mode" and a column of "control". In case that the execution result of the item (file) in the current mode (for example, the print mode) is "output", the scroll attribute of the item is set to the "normal". In case that the execution result in the current mode is "unoutput", the scroll attribute of the item is set to the "stop".

<Second Pattern>

FIG. 12 shows the scroll attribute determination table 630 in case of the second pattern ((Setting A) single determination+(Setting C) slowdown mode). The scroll attribute determination table 630 shown in FIG. 12 has a column of "output/unoutput in current mode" and a column of "control". In case that the execution result of the item (file) in the current mode is "output", the scroll attribute of the item is set to the "normal". In case that the execution result in the current mode is "unoutput", the scroll attribute of the item is set to the "slowdown (first slow mode)".

<Third Pattern>

Figure 9:
FIG. 9 is an explanatory view showing the scroll attribute determination table in case of the third pattern ((Setting A) multiple determination+(Setting B) one-step control+(Setting C) stop mode)

FIG. 9 shows the scroll attribute determination table 610 in case of the third pattern ((Setting A) multiple determination+ (Setting B) one-step control+(Setting C) stop mode). The scroll attribute determination table 610 shown in FIG. 9 has the column indicating the execution result (output/unoutput) in the current mode and the line indicating the execution results (output/unoutput) in the other modes. In each box of the table, the corresponding control is registered.

In case that the execution result of the item (file) in the current mode (for example, the print mode) is "unoutput" and the execution results in all of the other modes are "unoutput", that is, in case that the predetermined conditions are "unoutput" and the item fully satisfies the predetermined conditions with respect to the execution results in all of the execution function modes (a plurality of attributes), the scroll attribute of the item is set to the "stop". In case that the execution result in the current mode is "unoutput" and at least one of the execution results in the other modes is "output", that is, in case that the predetermined conditions are "unoutput" and the item partially satisfies the predetermined conditions with respect to the execution results (a plurality of attributes), the scroll attribute of the item is set to the "normal". Further, in case that the execution result in the current mode is "output", the scroll attribute of the item is set to the "normal" without depending on the output situation in the other modes.

<Fourth Pattern>

Figure 15:
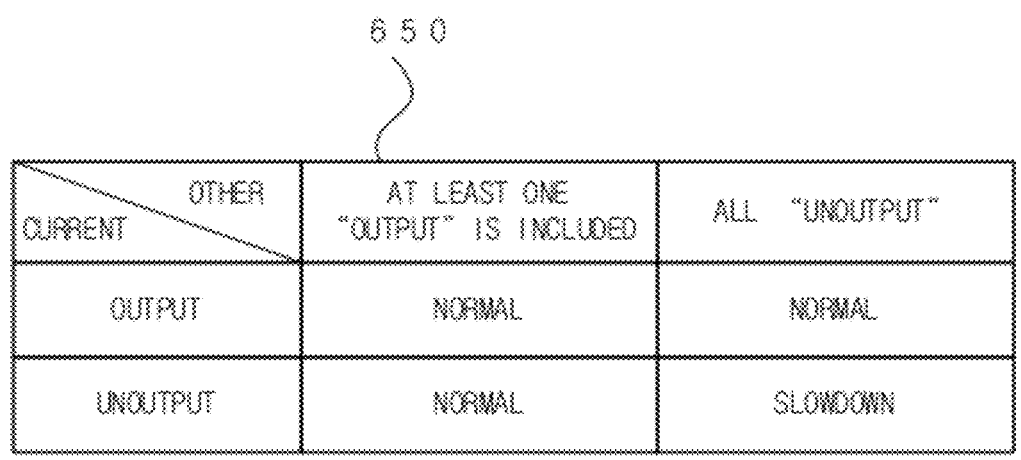
FIG. 15 is an explanatory view showing the scroll attribute determination table in case of the fourth pattern ((Setting A) multiple determination+(Setting B) one-step control+(Setting C) slowdown mode)

FIG. 15 shows the scroll attribute determination table 650 in case of the fourth pattern ((Setting A) multiple determination+(Setting B) one-step control+(Setting C) slowdown mode). The scroll attribute determination table 650 shown in FIG. 15 has the column indicating the execution result (output/unoutput) in the current mode and the line indicating the execution results (output/unoutput) in the other modes. In each box of the table, the corresponding control is registered.

In case that the execution result of the item (file) in the current mode (for example, the print mode) is "unoutput" and the execution results in all of the other modes are "unoutput", that is, in case that the predetermined conditions are "unoutput" and the item fully satisfies the predetermined conditions with respect to the execution results in all of the execution function modes (a plurality of attributes), the scroll attribute of the item is set to the "slowdown". In case that the execution result in the current mode is "unoutput" and at least one of the execution results in the other modes is "output", that is, in case that the predetermined conditions are "unoutput" and the item partially satisfies the predetermined conditions with respect to the execution results (a plurality of attributes), the scroll attribute of the item is set to the "normal". Further, in case that the execution result in the current mode is "output", the scroll attribute of the item is set to the "normal" without depending on the output situation in the other modes.

<Fifth Pattern>

Figure 10:
FIG. 10 is an explanatory view showing the scroll attribute determination table in case of the fifth pattern ((Setting A) multiple determination+(Setting B) two-step control+(Setting C) stop mode)
Figure 11:
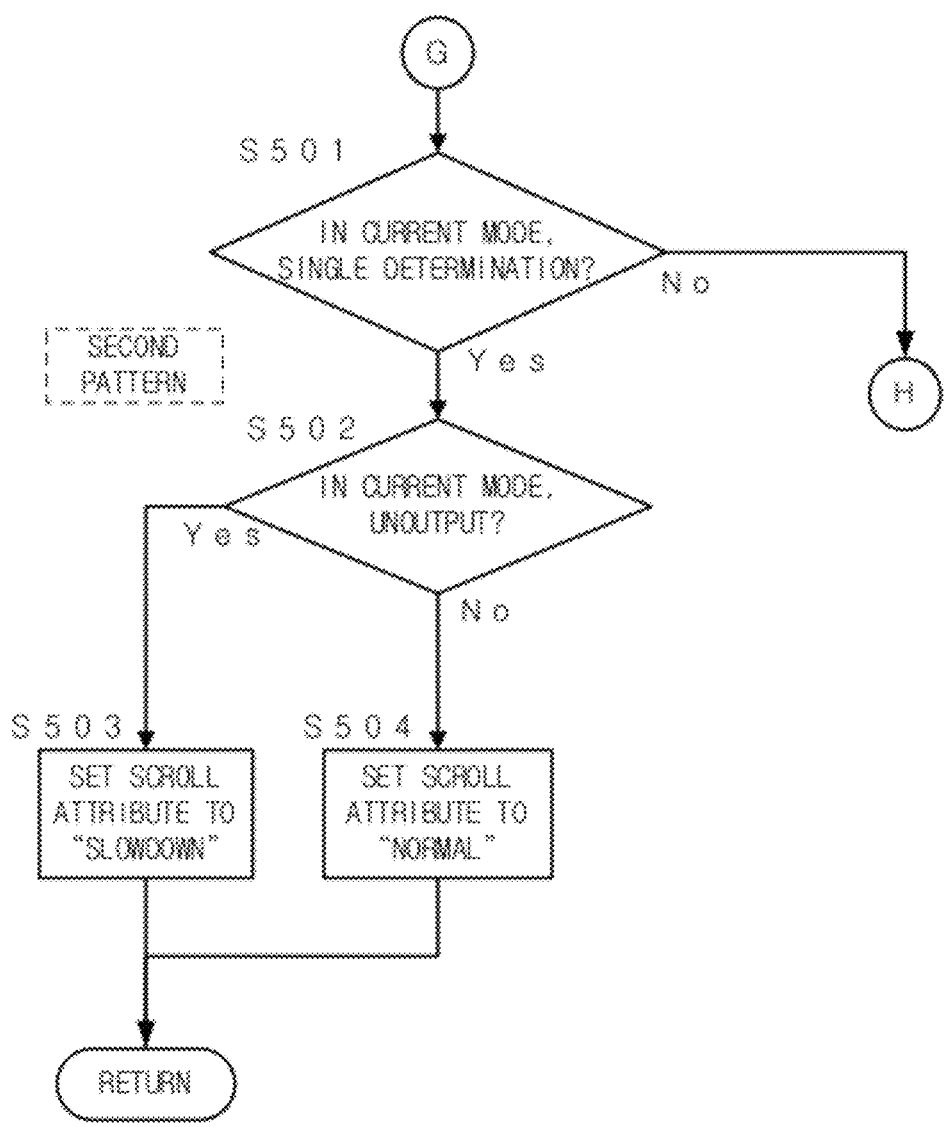
FIG. 11 is a flowchart showing the scroll attribute determination process, which follows the flowchart connector G of FIG. 6.
Figure 13:
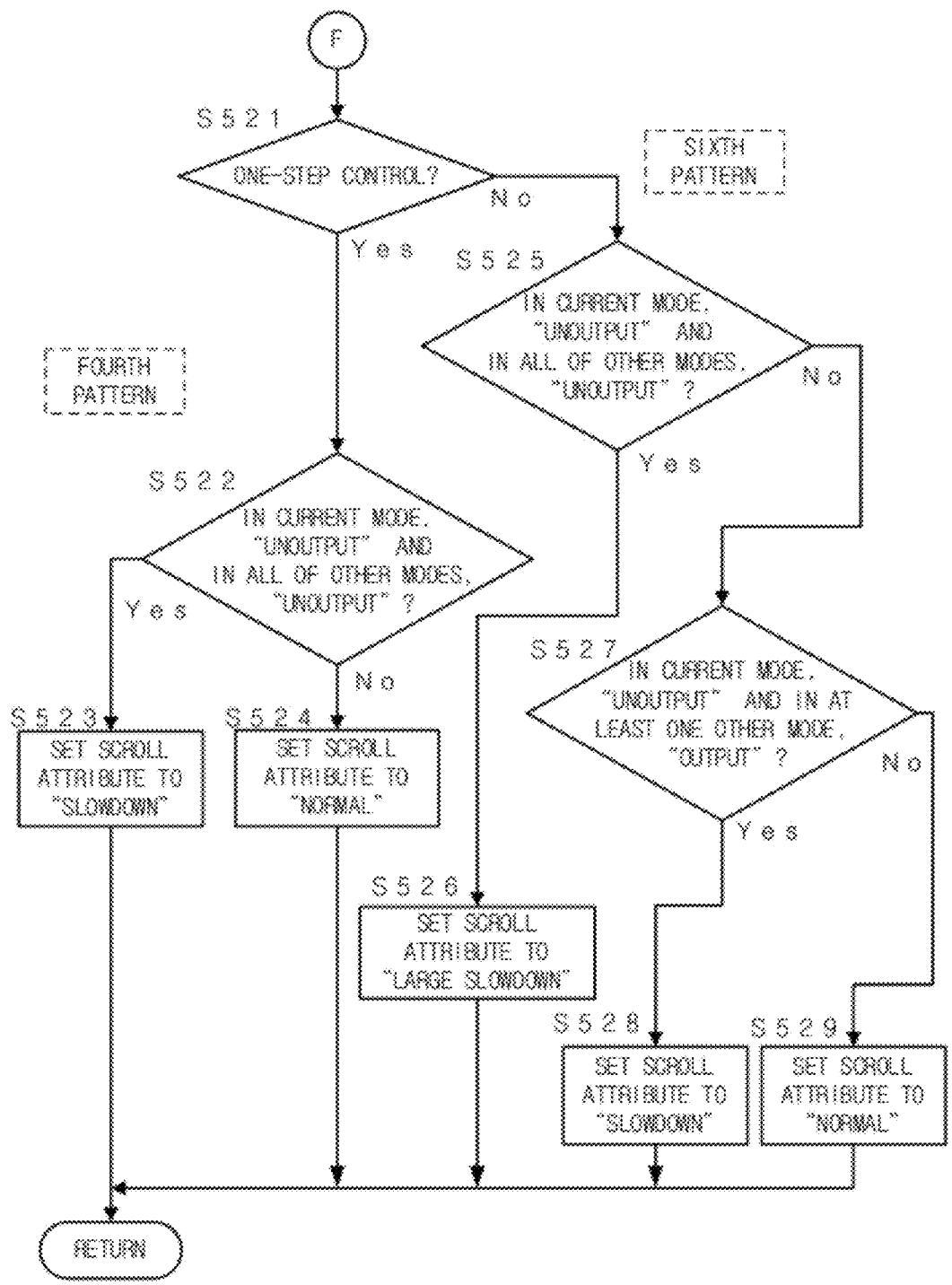
FIG. 13 is a flowchart showing the scroll attribute determination process, which follows the flowchart connector H of FIG. 11.

FIG. 10 shows the scroll attribute determination table 620 in case of the fifth pattern ((Setting A) multiple determination+(Setting B) two-step control+(Setting C) stop mode). The scroll attribute determination table 620 shown in FIG. 10 has the column indicating the execution result (output/unoutput) in the current mode and the line indicating the execution results (output/unoutput) in the other modes. In each box of the table, the corresponding control is registered.

In case that the execution result of the item (file) in the current mode (for example, the print mode) is "unoutput" and the execution results in all of the other modes are "unoutput", that is, in case that the predetermined conditions are "unoutput" and the item fully satisfies the predetermined conditions with respect to the execution results in all of the execution function modes (a plurality of attributes), the scroll attribute of the item is set to the "stop". In case that the execution result in the current mode is "unoutput" and at least one of the execution results in the other modes is "output", that is, in case that the predetermined conditions are "unoutput" and the item partially satisfies the predetermined conditions with respect to the execution results (a plurality of attributes), the scroll attribute of the item is set to the "slowdown (second slow mode)". Further, in case that the execution result in the current mode is "output", the scroll attribute of the item is set to the "normal" without depending on the output situation in the other modes.

<Sixth Pattern>

FIG. 14 shows the scroll attribute determination table 640 in case of the sixth pattern ((Setting A) multiple determination+(Setting B) two-step control+(Setting C) slowdown mode). The scroll attribute determination table 640 shown in FIG. 14 has the column indicating the execution result (output/unoutput) in the current mode and the line indicating the execution results (output/unoutput) in the other modes. In each box of the table, the corresponding control is registered.

In case that the execution result of the item (file) in the current mode (for example, the print mode) is "unoutput" and the execution results in all of the other modes are "unoutput", that is, in case that the predetermined conditions are "unoutput" and the item fully satisfies the predetermined conditions with respect to the execution results in all of the execution function modes (a plurality of attributes), the scroll attribute of the item is set to the "large slowdown (third slow mode)". In case that the execution result in the current mode is "unoutput" and at least one of the execution results in the other modes is "output", that is, in case that the predetermined conditions are "unoutput" and the item partially satisfies the predetermined conditions with respect to the execution results (a plurality of attributes), the scroll attribute of the item is set to the "slowdown (fourth slow mode)". Further, in case that the execution result in the current mode is "output", the scroll attribute of the item is set to the "normal" without depending on the output situation in the other modes. The third slow mode (large slowdown) is set so that the speed is slower than the speed in the fourth slow mode (slowdown).

As long as the speed in the third slow mode is slower than the speed in the fourth slow mode, the relation of the speed between the first, the second, the third and the fourth slow modes can be optionally set. For example, the speed in the fourth slow mode may be the same as that in the first slow mode. Further, the speed in the fourth slow mode can be set between the speed in the first slow mode and the speed in the third slow mode. The speed in the second slow mode may be the same as that in the fourth slow mode.

The setting of the scroll attribute is not limited to the above settings. For example, in case that the unoutput (unprocessed) files are included in any one of the execution function modes including the current mode, the scroll attributes of the unprocessed files can be set to slowdown.

<Scroll Attribute Determination Process>

FIGS. 6, 8, 11 and 13 show the detail of the scroll attribute determination process (Step S110). The CPU 10 carries out the process shown in FIGS. 6, 8, 11 and 13 on the basis of the programs stored in the ROM 90.

Figure 6:
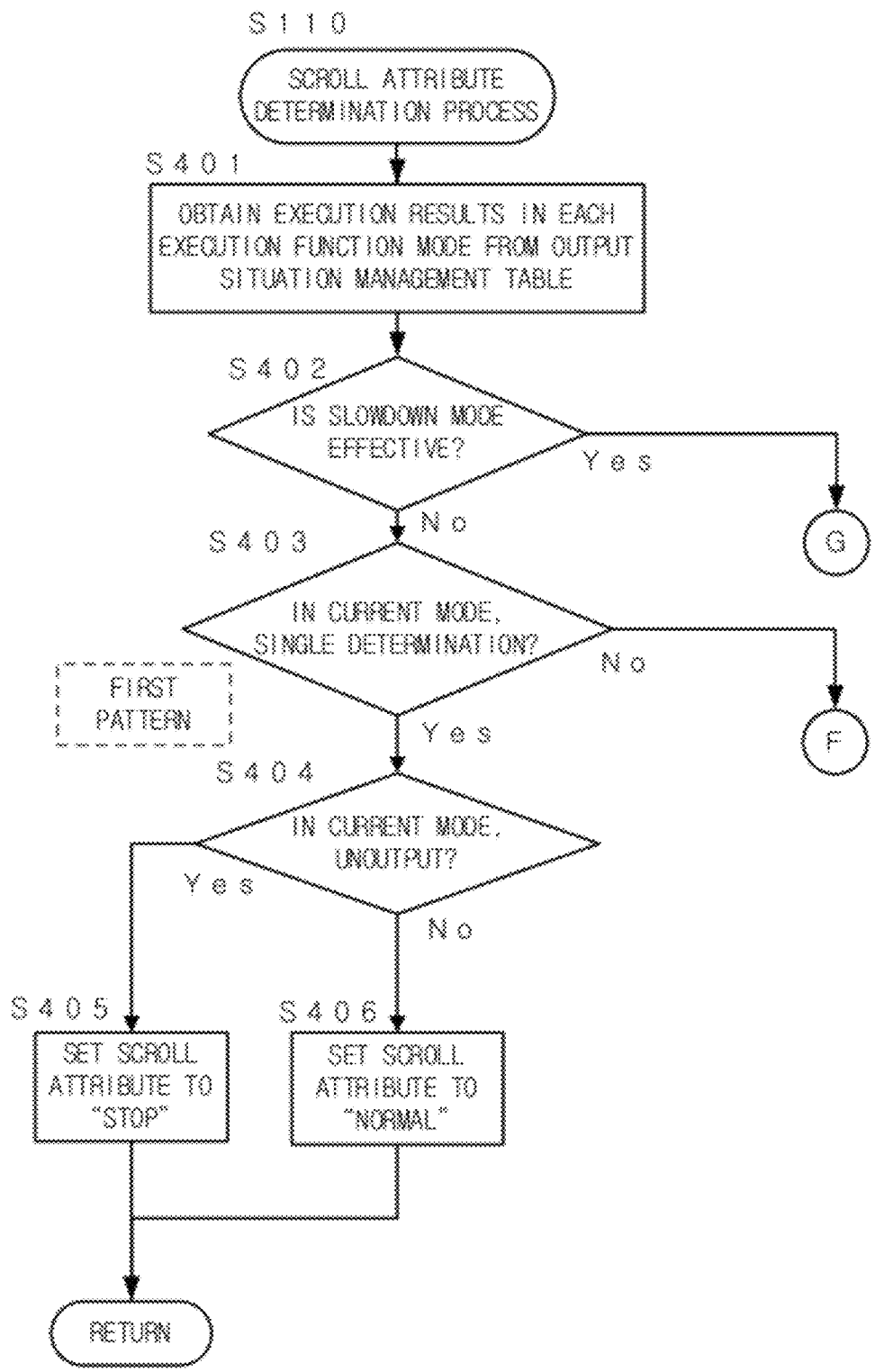
FIG. 6 is a flowchart showing the scroll attribute determination process.

The CPU 10 obtains the execution results (output/unoutput or success/failure) of the items in each of the execution function modes, from the output situation management table (for example, the unprocessed file management table 700) stored in the HDD 70 (Step S401 in FIG. 6).

Next, the CPU 10 sets one pattern for determining the scroll attribute among the first to the sixth patterns in accordance with the setting situation of the above described setting A (single determination/multiple determination), setting B (one-step control/two-step control) and setting C (slowdown mode/stop mode), and determines the scroll attribute by using the set one pattern.

In detail, in case that in the setting C, the stop mode is set (Step S402; No) and in the setting A, the single determination is set (Step S403; Yes), the CPU 10 sets the first pattern. In the first pattern, the scroll attribute is set in accordance with the scroll attribute determination table 600 shown in FIG. 7. That is, in case that the execution result of the item (file) in the current mode is "unoutput" (Step S404; Yes), the scroll attribute of the item is set to "stop" (Step S405). In case that the execution result is not "unoutput" (Step S404; No), the scroll attribute of the item is set to "normal" (Step S406).

FIG. 6 shows that the scroll attribute of only one item is set. However, in fact, the process shown in Steps S404 to S406 is carried out for all of the items registered in the output situation management table. In case that the scroll attributes of all of the items are set, the scroll attributes "normal", "stop", "slowdown" and the like of all of the items are registered, for example, like the scroll attributes of the unprocessed file management table 700 shown in FIG. 27.

In case that in the setting C, the stop mode is set (Step S402; No), in the setting A, the multiple determination is set (Step S403; No) and in the setting B, the one-step control is set (Step S421 in FIG. 8; Yes), the CPU 10 sets the third pattern. In the third pattern, the scroll attribute is set in accordance with the scroll attribute determination table 610 shown in FIG. 9. That is, in case that the execution result of the item in the current mode (for example, the print mode) is "unoutput" and the execution results in all of the other modes are "unoutput" (Step S422; Yes), the scroll attribute of the item is set to "stop" (Step S423). In the other cases (Step S422; No), the scroll attribute of the item is set to "normal" (Step S424).

In case that in the setting C, the stop mode is set (Step S402; No), in the setting A, the multiple determination is set (Step S403; No) and in the setting B, the two-step control is set (Step S421 in FIG. 8; No), the CPU 10 sets the fifth pattern. In the fifth pattern, the scroll attribute is set in accordance with the scroll attribute determination table 620 shown in FIG. 10. That is, in case that the execution result of the item in the current mode (for example, the print mode) is "unoutput" and the execution results in all of the other modes are "unoutput" (Step S425; Yes), the scroll attribute of the item is set to "stop" (Step S426). In case that the execution result in the current mode is "unoutput" and at least one of the execution results in the other modes is "output" (Step S427; Yes), the scroll attribute of the item is set to "slowdown (second slow mode)" (Step S428). In the other cases (Step S427; No), the scroll attribute of the item is set to "normal" (Step S429).

In case that in the setting C, the slowdown mode is set (Step S402 in FIG. 6; Yes) and in the setting A, the single determination is set (Step S501 in FIG. 11; Yes), the CPU 10 sets the second pattern. In the second pattern, the scroll attribute is set in accordance with the scroll attribute determination table 630 shown in FIG. 12. That is, in case that the execution result of the item (file) in the current mode is "unoutput" (Step S502; Yes), the scroll attribute of the item is set to "slowdown (first slow mode)" (Step S503). In case that the execution result in the current mode is not "unoutput" (Step S502; No), the scroll attribute of the item is set to "normal" (Step S504).

In case that in the setting C, the slowdown mode is set (Step S402 in FIG. 6; No), in the setting A, the multiple determination is set (Step S501 in FIG. 11; No) and in the setting B, the one-step control is set (Step S521 in FIG. 13; Yes), the CPU 10 sets the fourth pattern. In the fourth pattern, the scroll attribute is set in accordance with the scroll attribute determination table 650 shown in FIG. 15. That is, in case that the execution result of the item in the current mode (for example, the print mode) is "unoutput" and the execution results in all of the other modes are "unoutput" (Step S522; Yes), the scroll attribute of the item is set to "slowdown" (Step S523). In the other cases (Step S522; No), the scroll attribute of the item is set to "normal" (Step S524).

In case that in the setting C, the slowdown mode is set (Step S402 in FIG. 6; Yes), in the setting A, the multiple determination is set (Step S501 in FIG. 11; No) and in the setting B, the two-step control is set (Step S521 in FIG. 13; No), the CPU 10 sets the sixth pattern. In the sixth pattern, the scroll attribute is set in accordance with the scroll attribute determination table 640 shown in FIG. 14. That is, in case that the execution result of the item in the current mode (for example, the print mode) is "unoutput" and the execution results in all of the other modes are "unoutput" (Step S525; Yes), the scroll attribute of the item is set to "large slowdown (third slow mode)" (Step S526). In case that the execution result in the current mode is "unoutput" and at least one of the execution results in the other modes is "output" (Step S527; Yes), the scroll attribute of the item is set to "slowdown (fourth slow mode)" (Step S528). In the other cases (Step S527; No), the scroll attribute of the item is set to "normal" (Step S529).

Next, the process for determining the specific control standard position in Step S113 of FIG. 3 will be explained. First, the user sets the standard position for determining the specific control standard position according to the configuration.

<Selection of the Specific Control Standard Position and the Example of Setting Window>

Figure 16:
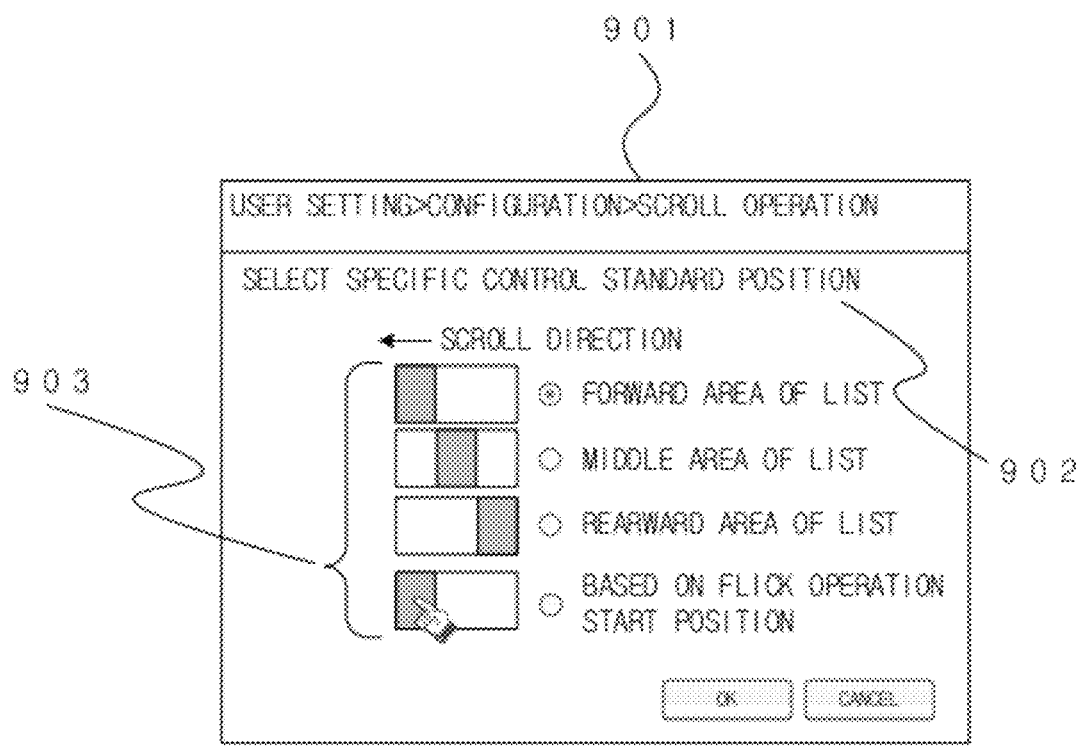
FIG. 16 is an explanatory view showing the specific control standard position setting window for setting the specific control standard position.

FIG. 16 shows the specific control standard position setting window 901 for setting the specific control standard position. In FIG. 16, the list control is simply described as "LIST".

In the specific control standard position setting window 901 shown in FIG. 16, the indication 902 for indicating the selection of the specific control standard position and the radio buttons 903 for selecting one of four options are displayed. In detail, the user can select one specific control standard position among the forward area (left), the middle area and the rearward area of the list control (area designation mode), or set the specific control standard position on the basis of the start position of the flick operation (flick operation start position mode). In case that the user selects the flick operation start position mode, the specific control standard position is set on the basis of the coordinate (flick operation start coordinate) on which the user's finger contacts to the screen at the starting of the flick operation.

For example, in case that the list control on the operation display unit 140 is divided into three areas of the forward area, the middle area and the rearward area, the middle position of the area including the x-coordinate of the flick operation start coordinate of the flick operation started by the user is set to the specific control standard position. Each of FIGS. 17 to 19 shows an example of the flick operation start position and the specific control standard position set on the basis of the flick operation start position in case that the list control is divided into the forward area, the middle area and the rearward area.

Figure 17:
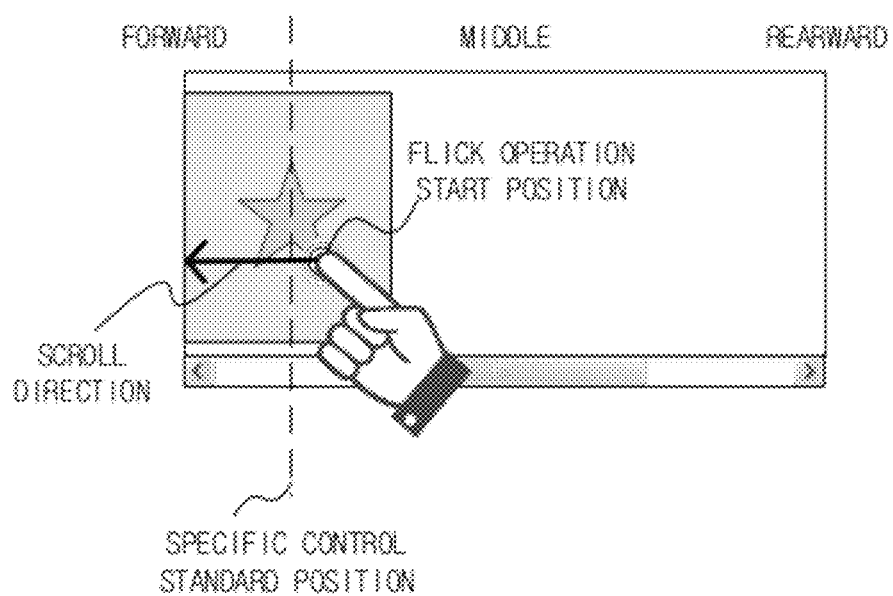
FIG. 17 is an explanatory view showing the operation in case that the middle position of the forward area of the list control in the scroll direction is determined as the specific control standard position.
Figure 18:
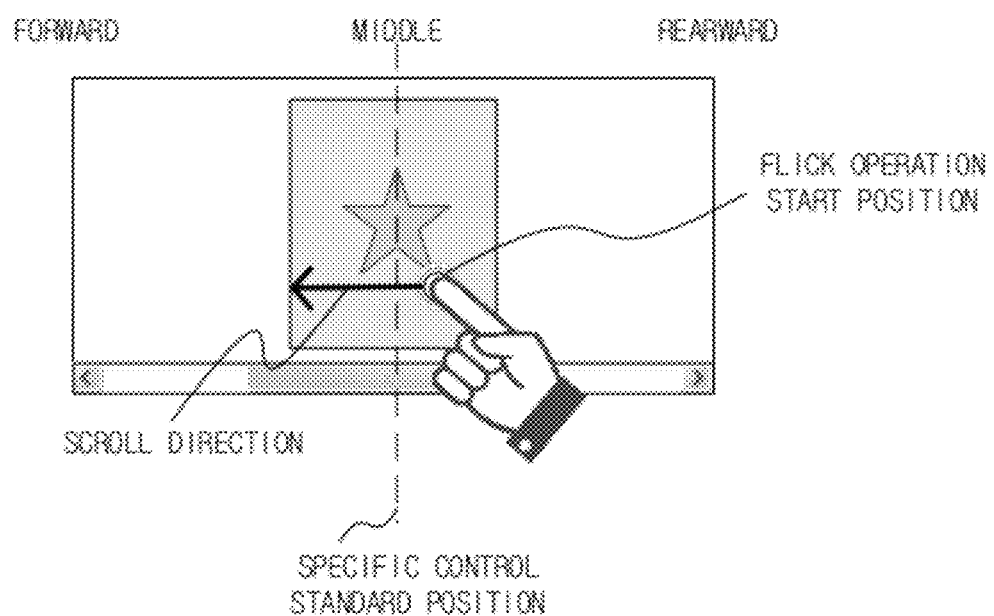
FIG. 18 is an explanatory view showing the operation in case that the middle position of the middle area of the list control in the scroll direction is determined as the specific control standard position.

FIG. 17 shows that the middle position of the forward area of the list control in the scroll direction is determined as the specific control standard position. Because the start position of the flick operation carried out by the user is in the forward area of the list control, the forward area of the list control is determined as the specific control standard position. FIG. 18 shows that the middle position of the middle area of the list control in the scroll direction is determined as the specific control standard position. Because the start position of the flick operation carried out by the user is in the middle area of the list control, the middle area of the list control is determined as the specific control standard position.

Figure 19:
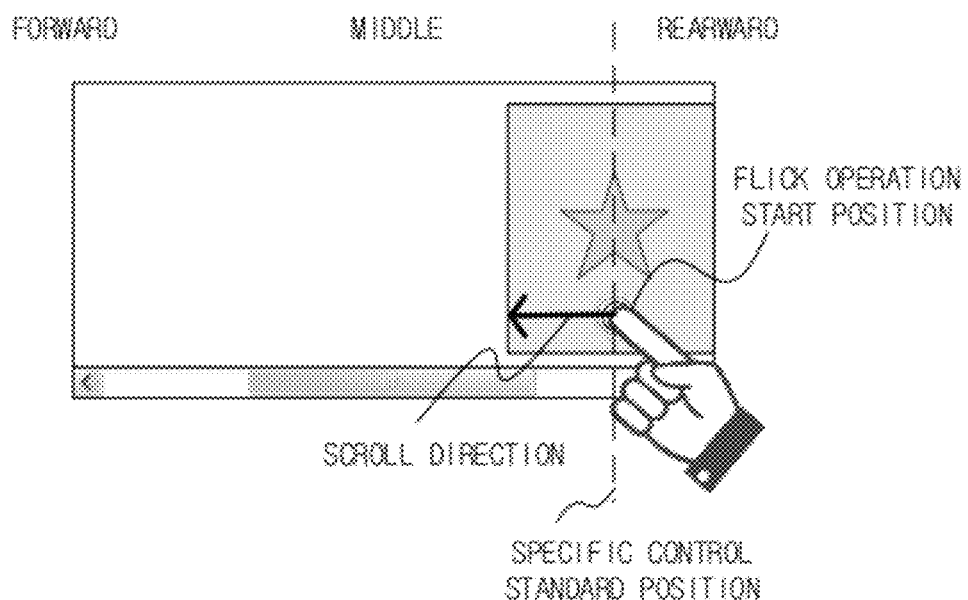
FIG. 19 is an explanatory view showing the operation in case that the middle position of the rearward area of the list control in the scroll direction is determined as the specific control standard position.

FIG. 19 shows that the middle position of the rearward area of the list control in the scroll direction is determined as the specific control standard position. Because the start position of the flick operation carried out by the user is in the rearward area of the list control, the rearward area of the list control is determined as the specific control standard position. In case of the flick operation start position mode, every time the user carries out the flick operation, the specific control standard position is automatically set.

In the specific control standard position setting window 901, when the area designation mode (forward, middle and rearward) or the flick operation start position mode is selected, the selected mode is stored as the setting value of the specific control standard position mode in the HDD 70.

<Process for Determining the Specific Control Standard Position>

Figure 20:
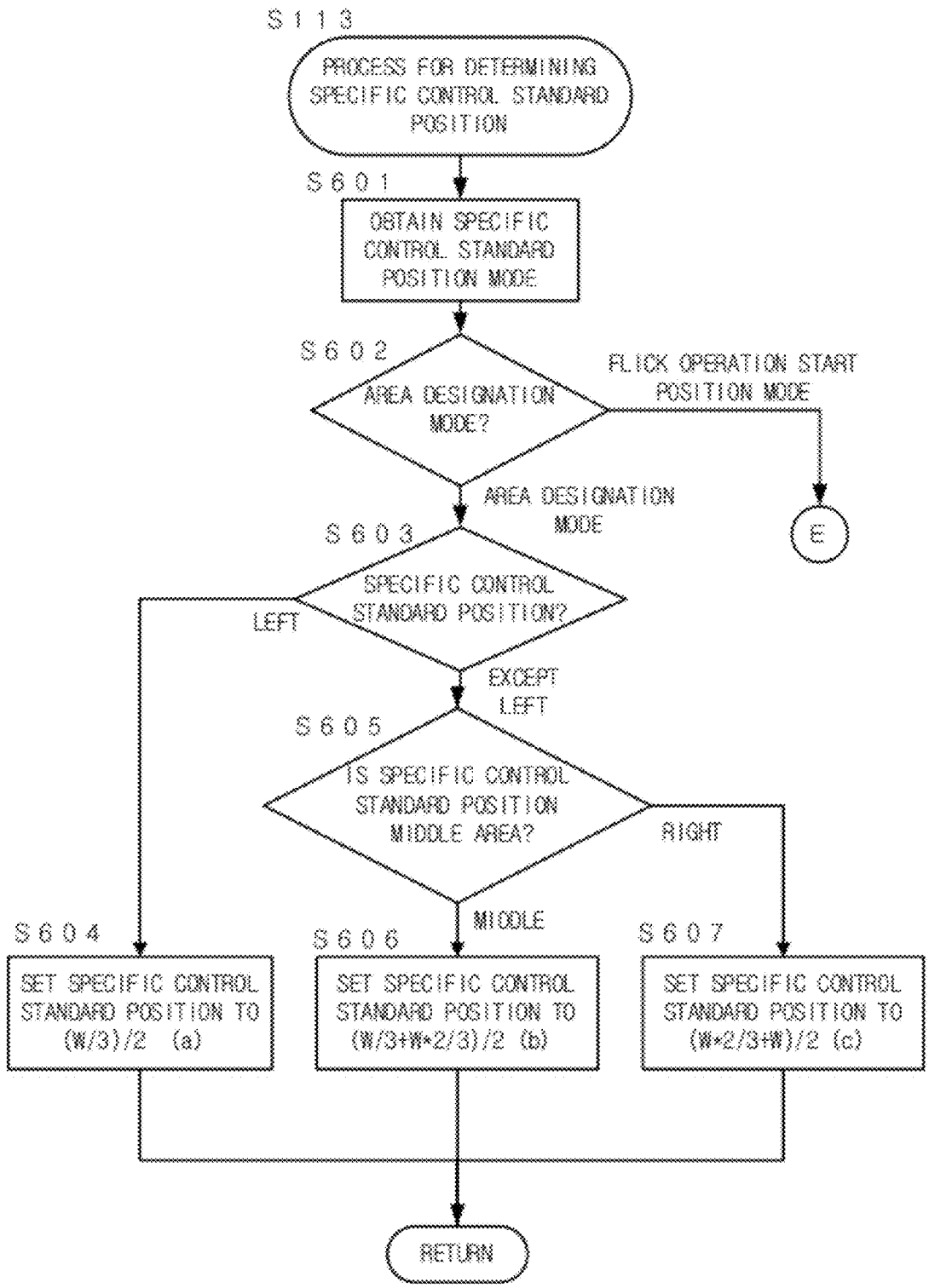
FIG. 20 is a flowchart showing the process for determining the specific control standard position.
Figure 22:
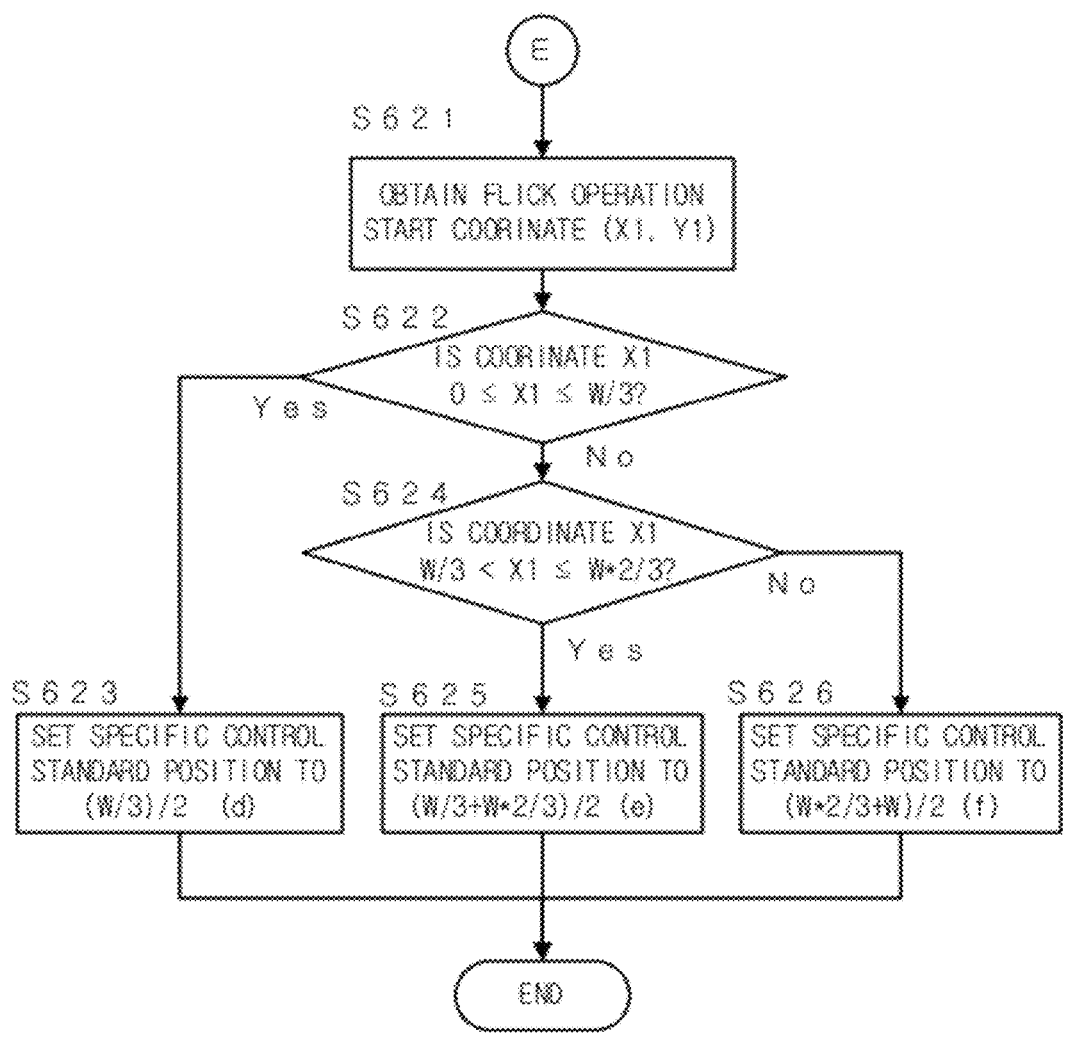
FIG. 22 is a flowchart showing the process for determining the specific control standard position of the scroll display by the flick operation of the user, which follows the flowchart connector E of FIG. 20.

FIGS. 20 and 22 show the operation of the process for determining the specific control standard position. The process shows the detail of Step S113 of FIG. 3. The CPU 10 carries out the process shown in FIGS. 20 and 22 in accordance with the programs stored in the ROM 90.

The CPU 10 obtains the setting value of the specific control standard position mode, which is stored in the HDD 70 (Step S601). The CPU 10 judges whether the setting value of the specific control standard position mode is the area designation mode or the flick operation start position mode (Step S602). In case of the area designation mode (Step S602; area designation mode), when the set specific control standard position is the forward area (left side) of the list control (Step S603; left), the CPU 10 sets the middle position of the forward area to the specific control standard position. Specifically, in case that W denotes the length of the list control in x-direction and the ordinary point (X=0) is set to the left end of the list control, the middle position of the forward area, which has x-coordinate of (W/3)/2 (referred to as the setting value (a)) is determined as the specific control standard position (Step S604).

When the set specific control standard position is the middle area of the list control (Step S603; except left and Step S605; middle), the CPU 10 sets the middle position of the middle area to the specific control standard position. Specifically, in case that W denotes the length of the list control in the x-direction and the ordinary point (X=0) is set to the left end of the list control, the middle position of the middle area, which has the x-coordinate of (W/3+W×2/3)/2 (referred to as the setting value (b)) is determined as the specific control standard position (Step S606). When the set specific control standard position is the rearward area (right side) of the list control (Step S603; except left and Step S605; right), the CPU 10 sets the middle position of the rearward (right) area to the specific control standard position. Specifically, the middle position of the rearward area, which has the x-coordinate of (W×2/3+W)/2 (referred to as the setting value (c)) is determined as the specific control standard position (Step S607).

Figure 21:
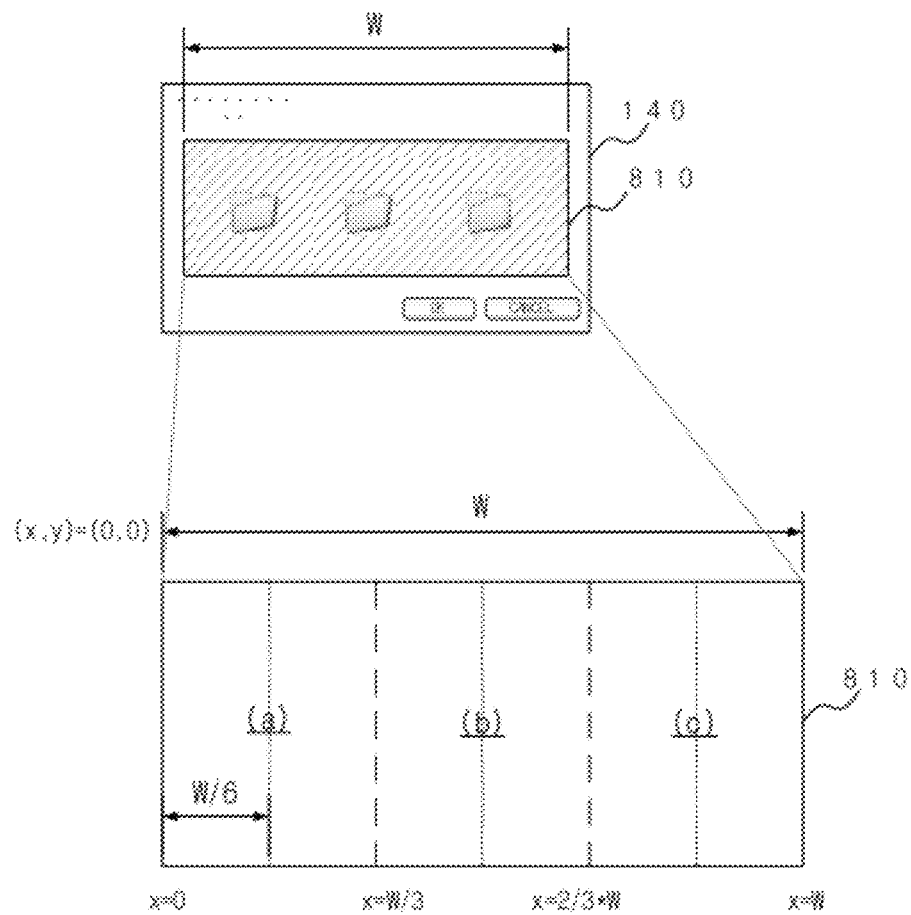
FIG. 21 is an explanatory view showing each specific control standard position which is determined in accordance with the setting value (a), (b) or (c)

FIG. 21 shows the specific control standard position set by the above setting values (a), (b) or (c). In FIG. 21, the list control 810 is provided on the operation display unit 140. The list control 810 is divided into three stop areas in the direction perpendicular to the length W. For example, in case that the above setting value is (W/3)/2 (=W/6), the specific control standard value is set to (a) shown in FIG. 21. Similarly, in case that the above setting value is (W/3+W×2/3)/2, the specific control standard value is set to (b). In case that the above setting value is (W×2/3+W)/2, the specific control standard value is set to (c).

Each of the above setting values is one for the specific control standard position which is set to the middle position of each area in case that the liquid crystal panel (the list control 810) is divided into three areas in the direction perpendicular to the length W. However, the specific control standard position is not limited to the middle position of each area. The specific control standard position can be optionally and finely set in each area. In the list control 810 of the operation display unit 140, the three display items are displayed at the same time. However, the number of the display items to be displayed at the same time is not limited to three. The user can optionally set the number of the display item to be displayed at the same time.

In case that the setting value of the specific control standard position mode, which is read out from the HDD 70 indicates the flick operation start position mode (Step S602 in FIG. 20; flick operation start position mode), the process proceeds to FIG. 22 via the flowchart connector E.

When the CPU 10 detects the flick operation carried out by the user in Step S113 of FIG. 3, the CPU 10 obtains the coordinate (X1, Y1) (referred to as the flick operation start coordinate) on which the user carries out the flick operation (Step S621).

Figure 23:
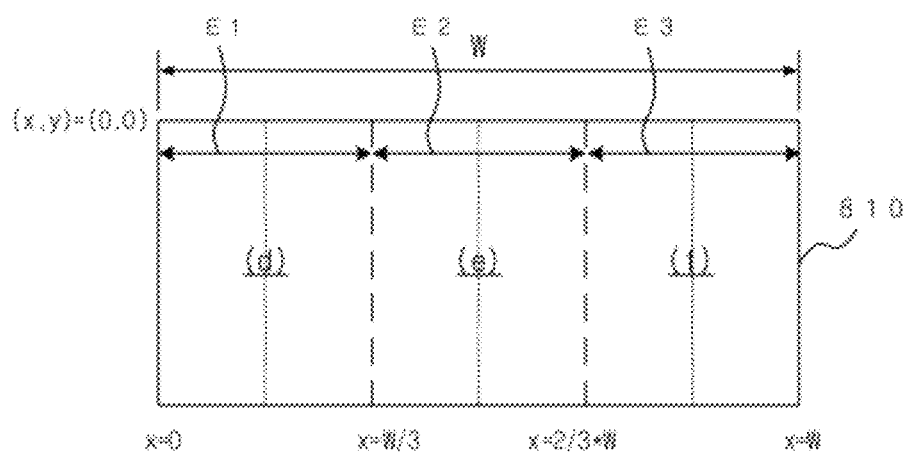
FIG. 23 is an explanatory view showing the specific control standard position which is set in accordance with the start position of the flick operation.

The CPU 10 determines the specific control standard position in accordance with the x-coordinate (X1) of the obtained flick operation start coordinate. That is, when the x-coordinate (X1) of the flick operation start coordinate is 0≤X1≤W/3 (Step S622; Yes), the CPU 10 sets the specific control standard position to (d) having the x-coordinate of (W/3)/2 (Step S623). That is, as shown in FIG. 23, when the flick operation start coordinate is in the forward area (E1), the specific control standard position is set to the middle position of the forward area.

When the x-coordinate (X1) of the flick operation start coordinate is W/3<X1≤W×2/3 (Step S622; No, Step S624; Yes), the CPU 10 sets the specific control standard position to (e) having the x-coordinate of (W/3+W×2/3)/2 (Step S625). That is, as shown in FIG. 23, when the flick operation start coordinate is in the middle area (E2), the specific control standard position is set to the middle position of the middle area.

When the x-coordinate (X1) of the flick operation start coordinate is W×2/3<X1≤W (Step S622; No, Step S624; No), the CPU 10 sets the specific control standard position to (f) having the x-coordinate of (W×2/3+W)/2 (Step S626). That is, as shown in FIG. 23, when the flick operation start coordinate is in the rearward area (E3), the specific control standard position is set to the middle position of the rearward area. Thereby, the CPU 10 automatically determines the specific control standard position every time the CPU 10 obtains the flick operation start coordinate from the user.

As described above, the specific control standard position is set to the middle position of the area including the x-coordinate of the flick operation start position in which the user's finger contacts to the screen. In this embodiment, the specific control standard position is set to the middle position of each of the areas into which the list control 810 is divided. The specific control standard position is not limited to this. Even in case that a plurality of display items are arranged in one line (or one column), the above process for determining the specific control standard position can be applied. The process applied to the above case will be explained as follows.

Figure 24:
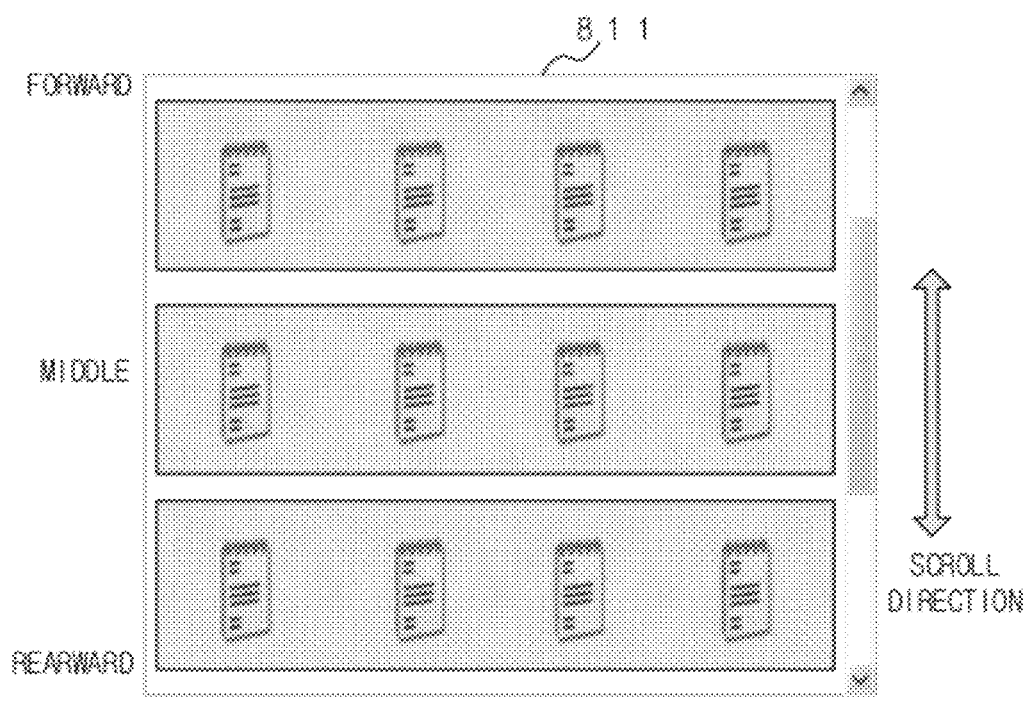
FIG. 24 is an explanatory view showing an example of the list control in which the display items (icons) are displayed so as to form the 4×3 matrix.

FIG. 24 shows an example in which the display items (file) are displayed in the list control 811 so as to form the 4×3 matrix. In this case, by carrying out the scroll display in the longitudinal direction, four display items (files) are displayed in each line. In this case, the list control 811 is divided into the forward area, the middle area and the rearward area in order from the upper line. In case that the scroll attribute of any one of the three display items arranged in the same line is "stop" or "slowdown", the scroll display is stopped or slowed down when the above line comes to the specific control standard position.

In FIG. 24, the list control 811 is divided into three areas which are the upper (forward) area, the middle area and the lower (rearward) area. However, the list control 811 can be divided into four or more areas, and the specific control standard positions can be finely set.

FIRST EXAMPLE

The first example is explained on the basis of the above embodiment. In this example, it is assumed that the use wants to carry out the direct print of the file stored in the USB memory on print paper. The user selects the file to be printed from the list of the files stored in the USB memory. At this time, the user wants to select the files which have not been printed out in order, and to sequentially carry out the direct print of the files.

Firstly, the control for the scroll display in the following case, will be explained. The user carries out the flick operation to carry out the scroll display of the display items (thumbnails) on the operation display unit 140. When the display item (thumbnail) corresponding to the unoutput item (file) is displayed in the list control 810, the scroll display is quickly stopped so as to stop the display item corresponding to this item in the specific control standard position which is previously set.

In this case, the first pattern in which the scroll display is stopped in accordance with only the execution result in the current mode is set. That is, the control for the scroll display in case of "(Setting A) single determination+(Setting C) stop mode" will be explained.

First, the user inserts the USB memory into the USB memory insert unit 150 of the image processing device 100. When the USB memory is inserted into the USB memory insert unit 150, the CPU 10 of the image processing device 100 reads out the file of the output situation management table related to the unique device name of the USB memory, from the HDD 70. With respect to the read output situation management table, when the output/unoutput mode is set by the configuration or the like, the unprocessed file management table is read out. When the success/failure mode is set, the success/failure management table is read out. Then, the file selection window (thumbnail display window) is displayed on the operation display unit 140. In this case, the output/unoutput mode is set.

Figure 25:
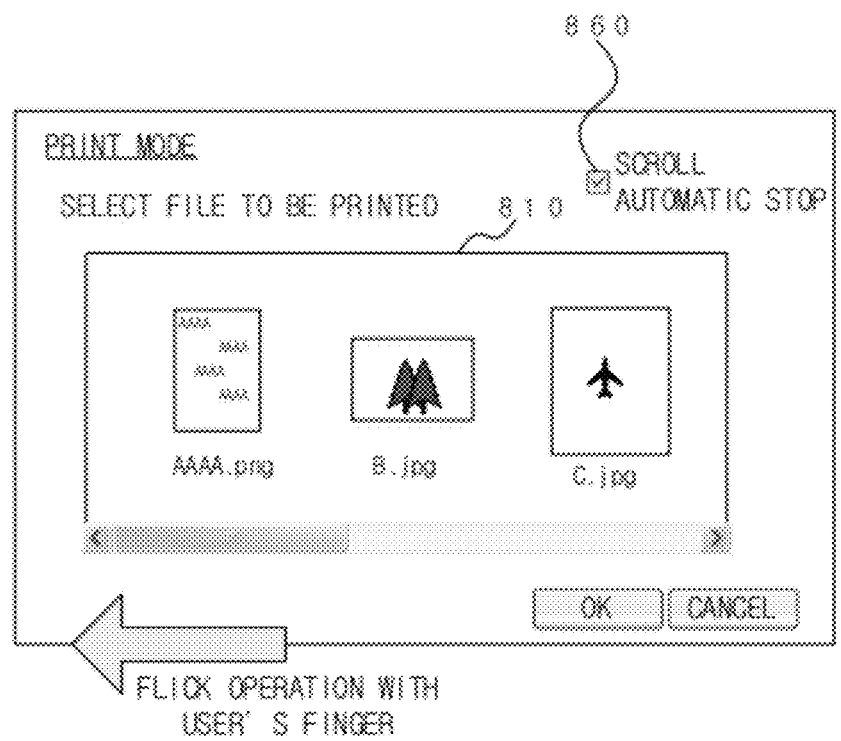
FIG. 25 is an explanatory view showing an example of the file selection window (thumbnail display window) in case that the scroll display is carried out in the print mode.

FIG. 25 shows an example of the file selection window (thumbnail display window) in case that the scroll display is carried out in the print mode. In this example, the initial state prior to the scroll display is shown. In FIG. 25, three thumbnails (display items) which are AAAA.png, B.jpg and C.jpg, are displayed in the list control 810. The CPU 10 of the image processing device 100 reads out the unprocessed file management table 700 shown in FIG. 27.

FIG. 27 shows the unprocessed file management table 700 readout from the HDD 70. The unprocessed file management table 700 shown in FIG. 27, comprises the column of the file name, the column of the execution function mode and the column of the scroll attribute. Further, the column of the execution function mode has three modes which are the print mode, the FAX mode and the Scan To Email mode. In the column of the file name, the file name of each file is entered. In the column of the execution function mode, the output information indicating whether the output of each file is executed with respect to each execution function mode, is shown by using "output/unoutput" (The "output" means that the file has been output and the "unoutput" means that the file has not been output.). In the column of the scroll attribute, the scroll attribute values of the respective files in the print mode are registered. The scroll attribute value is determined by the above-described scroll attribute determination process when the display items are displayed.

In this example, the scroll attribute value is determined in the first pattern (in accordance with the scroll attribute determination table 600 shown in FIG. 7). That is, the scroll attribute value is determined in accordance with only the execution results in the print mode which is the current mode. In the example of FIG. 27, because the files "AAAA.png", "B.jpg" and "C.jpg" have been output in the print mode, the scroll attribute values thereof are "normal". Because the files "eaa.pdf" and "fbb.png" have not been output in the print mode, the scroll attribute values thereof are "stop". As described above, the scroll display is controlled in accordance with the scroll attribute shown in FIG. 27. It is assumed that in FIG. 25, the specific control standard position is set to the left end of the list control 810 (the front end of the list control in the scroll direction).

When the user carries out the flick operation from right to left in the print mode shown in FIG. 25, the scroll display of the thumbnails (display items) in the list control 810 are carried out in the left direction. This scroll display is stopped in accordance with the scroll attribute shown in FIG. 27 when the thumbnail (display item) corresponding to the unoutput file (item) reaches the specific control standard position.

FIG. 26 shows the situation in which the scroll display is quickly stopped when the thumbnail (display item) having a file name as "eaa.pdf" reaches the specific control standard position. In FIG. 26, the files "eaa.pdf", "fbb.png" and "fx.jpg" are displayed as the unoutput files by using the thumbnails (display items).

Even if the speed of the scroll display carried out by the flick operation is sufficiently high or the flick operation is carried out many times after the user carries out the flick operation and before the scroll display is stopped, the scroll display is quickly stopped when the thumbnail corresponding to the file unoutput in the print mode reaches the specific control standard position. In many scroll displays caused by the flick operation, the pseudo friction is simulated when the display items are moved. Therefore, the scroll speed is gradually decreased so as to naturally slow down and stop the scroll display. However, in the embodiment, even before the scroll display is stopped by simulating the pseudo friction, the scroll display is quickly stopped when the thumbnail corresponding to the file unoutput in the print mode reaches the specific control standard position.

The unprocessed file management table 700 may be stored, for example, as a file which is related to the unique device name of the USB memory, in the HDD 70 of the image processing device 100. Alternatively, the unprocessed file management table 700 may be stored as a hidden file in the file system area of the USB memory or in a specific area out of the file system area.

In FIG. 25, the specific control standard position is set to the front end of the list control in the scroll direction (the left end of the list control). Further, the scroll attribute of the file "eaa.pdf" shown in FIG. 27 is "stop". Therefore, in FIG. 26, when the thumbnail "eaa.pdf" reaches the specific control standard position which is the front end (left end) of the list control, the scroll display is stopped.

In this case, when the file "eaa.pdf" is printed out, the file "eaa.pdf" is recognized as a file output in the print mode. Therefore, when the scroll display is carried out in the next print mode, the scroll attribute of the file "eaa.pdf" is changed to "normal" and the scroll display is not stopped when the thumbnail "eaa.pdf" reaches the specific control standard position. In case that after the file "eaa.pdf" is printed out, the execution function mode is changed from the print mode to the FAX mode and the scroll display is carried out in the FAX mode, because the file "eaa.pdf" has not been transmitted in the FAX mode, the scroll display of the thumbnail "eaa.pdf" is not carried out and remains stopped. In the FAX mode shown in FIG. 27, because all of the files have not been transmitted (output), the scroll attributes of all of the files are "stop". Therefore, in case of the first pattern, the scroll display cannot be carried out in the FAX mode.

In this example, the mode in which the scroll display is stopped when the thumbnail of the unoutput file reaches the specific control standard position, is explained. However, the mode in which the scroll display is stopped when the thumbnail of the file for which the process is failed reaches the specific control standard position (that is, the success/failure mode), can be adopted. In the present embodiment, the user can optionally select one of the above modes by the configuration or the like.

Next, the case in which the speed of the scroll display is controlled in accordance with the execution result of the current mode and the execution results of the other modes, will be explained. In this case, the fifth pattern is set as the method for determining the scroll attribute. That is, the control for the scroll display in case of "(Setting A) multiple determination+(Setting B) two-step control+(Setting C) stop mode" will be explained.

Figure 28:
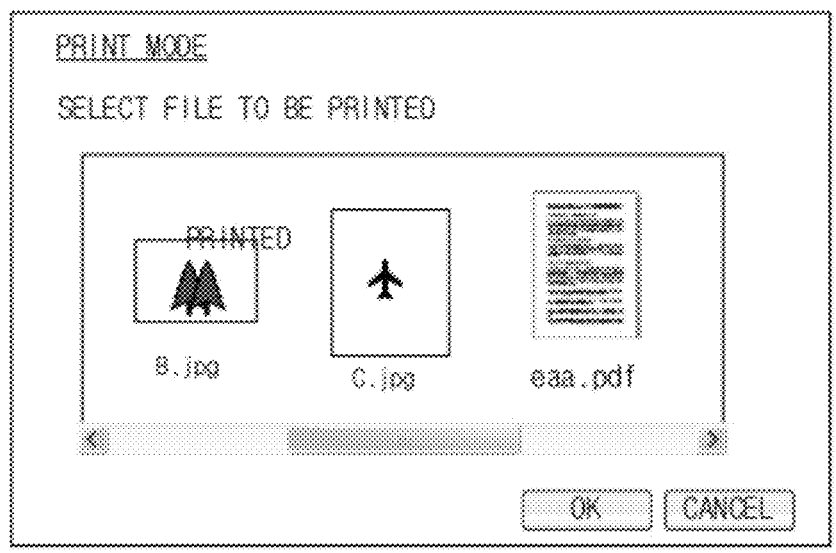
FIG. 28 is an explanatory view showing the file selection window (thumbnail display window) in case that a list of the files stored in the USB memory is displayed in the print mode.

FIG. 28 shows the file selection window (thumbnail display window) in case that a list of the files stored in the USB memory is displayed in the print mode. In this case, it is assumed that the user prints out the file (item) having a name as "C.jpg" and the specific control standard position is set to the middle position of the list control.

Further, in this case, it is assumed that the user changes the execution function mode from the print mode to the FAX mode after the file "C.jpg" is printed out in the print mode. The scroll attribute in the FAX mode will be explained by using the drawings.

FIG. 29 shows the unprocessed file management table 710 in case that the file "C.jpg" has been printed out. The unprocessed file management table 710 shown in FIG. 29 has the same structure as the unprocessed file management table 700 shown in FIG. 27. In this case, because the fifth pattern is set as the method for determining the scroll attribute, the scroll attribute values in the FAX mode are determined in accordance with the scroll attribute determination table 620 shown in FIG. 10.

In the scroll attribute determination table 620 shown in FIG. 10, when the execution result of the item (file) in the current mode (for example, the print mode) is "unoutput" and the execution results of the item in all of the other modes are "unoutput", the scroll attribute of the item is set to the "stop". In case that the execution result in the current mode is "unoutput" and at least one of the execution results in the other modes is "output", the scroll attribute of the item is set to the "slowdown". Further, in case that the execution result in the current mode is "output", the scroll attribute of the item is set to the "normal" without depending on the output situation in the other modes.

Therefore, in the unprocessed file management table 710 shown in FIG. 29, because the file "AAAA.png" has been output in the print mode, has been output in the FAX mode and has not been output (unoutput) in the Scan To Email mode, the scroll attribute of the file "AAAA.png" is set to "normal". Because the file "B.jpg" has been output in the print mode, has been output in the FAX mode and has not been output (unoutput) in the Scan To Email mode, the scroll attribute of the file "B.jpg" is set to "normal". Because the file "C.jpg" has been output in the print mode, has not been output (unoutput) in the FAX mode and has not been output (unoutput) in the Scan To Email mode, the scroll attribute of the file "C.jpg" is set to "slowdown". Because the file "eaa.pdf" has not been output (unoutput), has not been output (unoutput) in the FAX mode and has not been output (unoutput) in the Scan To Email mode, the scroll attribute of the file "eaa.pdf" is set to "stop". Because the file "fbb.png" has not been output (unoutput), has not been output (unoutput) in the FAX mode and has not been output (unoutput) in the Scan To Email mode, the scroll attribute of the file "fbb.png" is set to "stop".

Figure 30:
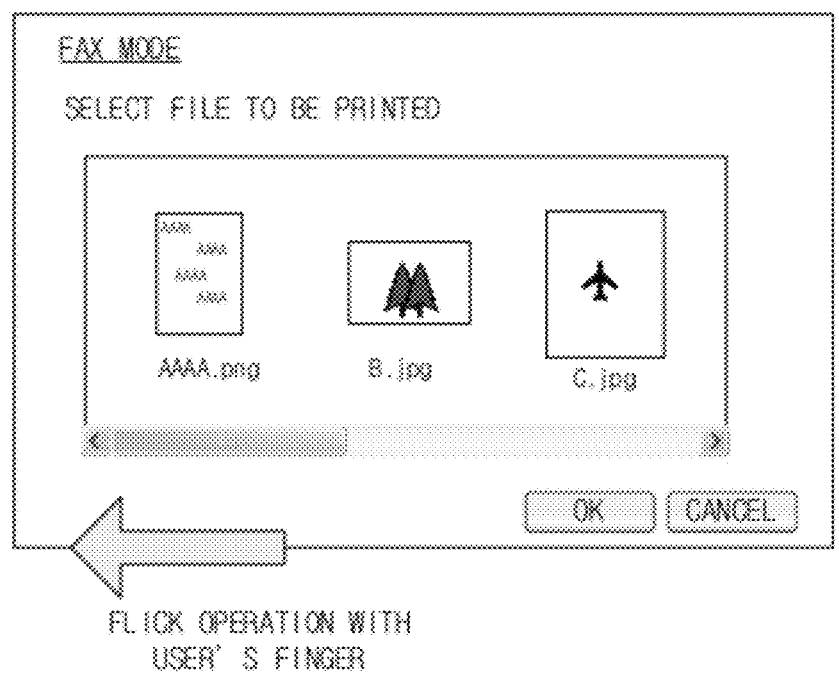
FIG. 30 is an explanatory view showing the file selection window in the facsimile mode before the scroll display is started.
Figure 31:
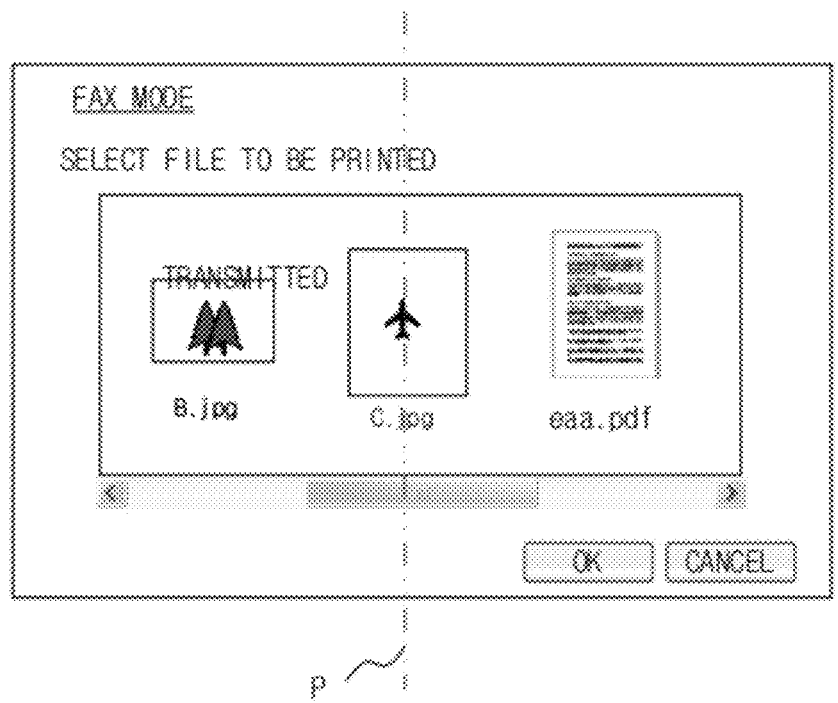
FIG. 31 is an explanatory view showing the file selection window in case that the scroll display is carried out in the facsimile mode.

FIG. 30 shows the file selection window in the FAX mode before the scroll display is started. In the list control of the file selection window, the three thumbnails (display items) corresponding to the three files "AAAA.png", "B.jpg" and "C.jpg" are displayed. In the situation of FIG. 30, when the user carries out the flick operation from right to left, the scroll display of the thumbnails (display items) in the list control is started in the left direction. The specific control standard position is set to the middle position of the list control. In FIG. 31, the situation in which the scroll display is carried out is shown.

FIG. 31 shows the file selection window in case that the scroll display is carried out in the FAX mode. In FIG. 31, when the thumbnail (display item) of the file "C.jpg" comes to the specific control standard position P which is the middle position of the list control, the CPU 10 slows down the scroll display to the predetermined scroll display speed v1 in accordance with the scroll attribute shown in FIG. 29. The thumbnail "C.jpg" passes through the specific control standard position P at the scroll display speed v1, and the slowdown of the scroll display is cancelled after the thumbnail (display item) of the file "C.jpg" passes through the specific control standard position P. At this time, because the thumbnail (display item) of the file "eaa.pdf" which is next to the file "C.jpg" comes to the specific control standard position P, the scroll display speed is controlled in the specific control standard position P in accordance with the scroll attribute of the file "eaa.pdf". As described above, the scroll display is controlled in accordance with the scroll attribute in the specific control standard position P.

Figure 32:
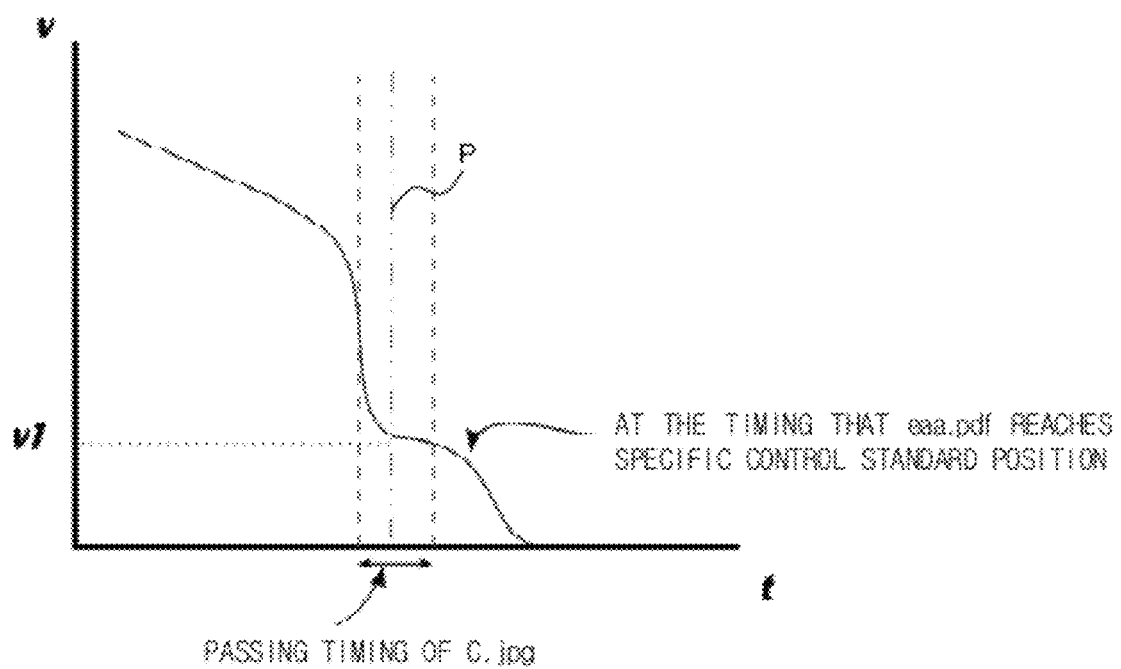
FIG. 32 is a graph showing the change in the speed of the scroll display before and after the thumbnail of the file "C.jpg" reaches the specific control standard position in case that the scroll attribute of the file "C.jpg" is set to "slowdown" and the scroll attribute of the file "eaa.pdf" is set to "stop"

FIG. 32 is a graph showing the change in the speed of the scroll display before and after the thumbnail (display item) of the file "C.jpg" reaches the specific control standard position P. After the flick operation, the scroll display of the items is carried out while the scroll display is constantly slowed down by simulating the pseudo friction. When the thumbnail (display item) of the file "C.jpg" moves just before the specific control standard position P which is the middle position of the list control (just before the scroll display speed is controlled in the specific control standard position P), the CPU 10 slows down the scroll display speed to the speed v1. When the thumbnail (display item) of the file "C.jpg" passes through the specific control standard position P at the speed v1, the thumbnail (display item) of the file "eaa.pdf" which is next to the file "C.jpg" comes to the specific control standard position P which is the middle position of the list control. Because the file "eaa.pdf" has not been output (unoutput) in the FAX mode, the print mode and the Scan To Email mode, the scroll attribute thereof is "stop". Therefore, the CPU 10 stops the scroll display in accordance with the scroll attribute of the file "eaa.pdf" at the timing that the thumbnail (display item) of the file "eaa.pdf" reaches the specific control standard position P.

On the other hand, for example, it is assumed that the file "eaa.pdf" has been transmitted (output) in the FAX mode. In this case, the unprocessed file management table 720 is one shown in FIG. 33. The differences between FIG. 29 and FIG. 33 are that the file "eaa.pdf" has been output in the FAX mode and the scroll attribute of the file "eaa.pdf" is set to "normal" in FIG. 33. The table shown in FIG. 33 is the same as that in FIG. 29 except the above differences. Therefore, the detail explanation of FIG. 33 is omitted.

In case of the situation shown in FIG. 33, when the user starts the flick operation, the thumbnail (display item) of the file "eaa.pdf" passes through the specific control standard position P without stopping the scroll display because the scroll attribute of the file "eaa.pdf" is set to "normal". Therefore, the scroll display is controlled as follows. When the thumbnail (display item) of the file "C.jpg" comes to the specific control standard position P, the scroll display speed is slowed down. After the thumbnail (display item) of the file "C.jpg" passes through the specific control standard position P, the scroll display is controlled so as to return the scroll display speed to the speed which is one in case that the slowdown caused by the file "C.jpg" is not carried out.

Figure 34:
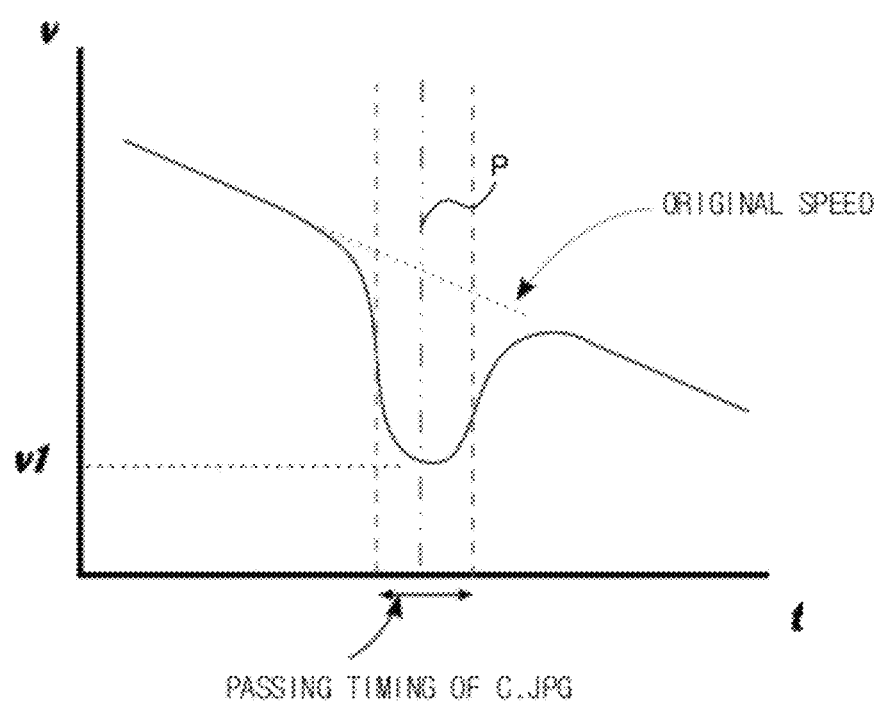
FIG. 34 is a graph showing the change in the speed of the scroll display in case that the scroll attribute of the file "C.jpg" is set to "slowdown" and the scroll attribute of the file "eaa.pdf" is set to "normal"

FIG. 34 is a graph showing the change in the speed of the scroll display in case that the scroll attribute of the file "C.jpg" is set to "slowdown" and the scroll attribute of the file "eaa.pdf" is set to "normal". In FIG. 34, the original speed in which the speed of the scroll display caused by the flick operation is constantly decreased with time, is shown by using a dashed line. When the thumbnail (display item) of the file "C.jpg" passes through the specific control standard position P which is the middle position of the list control, the CPU 10 slows down the scroll display speed to the speed v1. Then, the CPU 10 controls the scroll display to return the scroll display speed so as to match the original speed which is one in case that the slowdown caused by the file "C.jpg" is not carried out. Therefore, the scroll display speed is the lowest when the thumbnail (display item) of the file "C.jpg" passes through the specific control standard position P.

SECOND EXAMPLE

In the first example, the user inserts the USB memory into the image processing device 100 and uses the direct print function. In the second example, for example, the scroll display controlling method can be applied to a list window of a job history.

Figure 35:
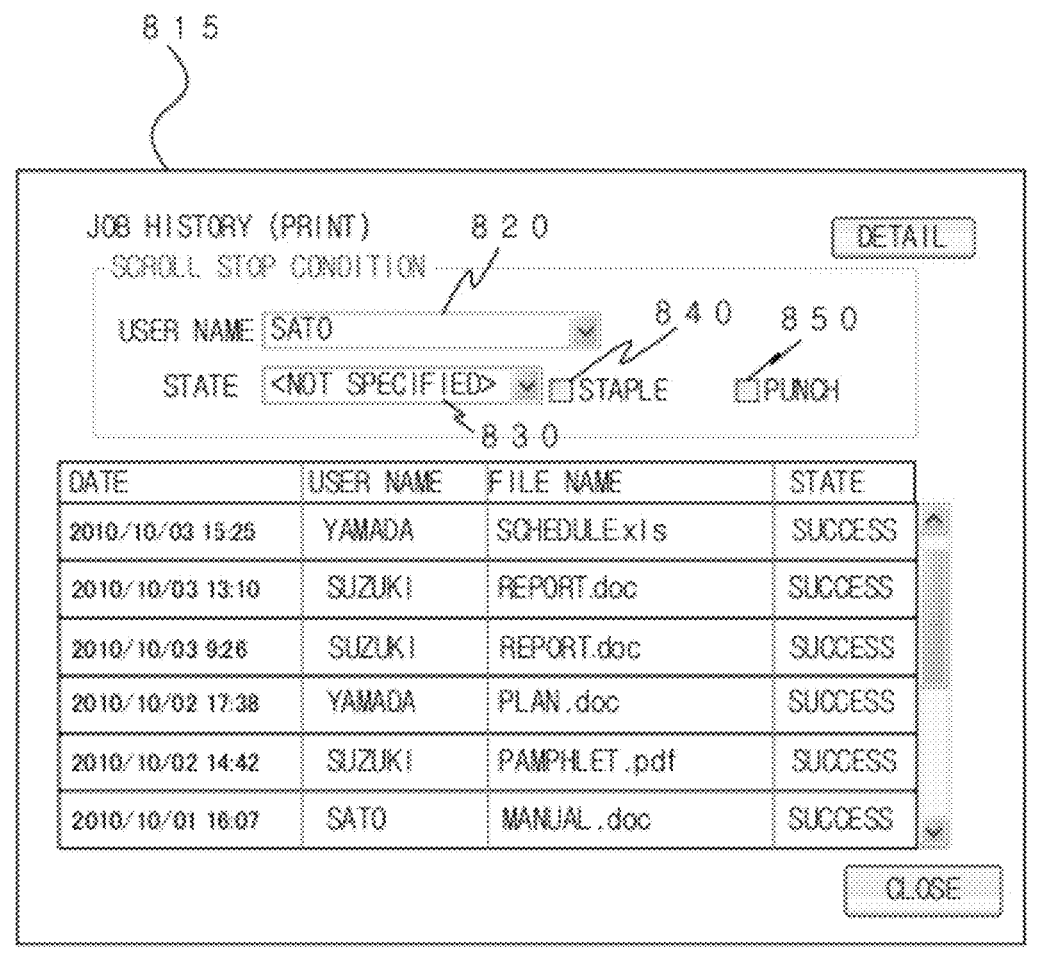

FIG. 35 shows an example of the job history window 815 which is the list window showing the print history of the image processing device 100. In the job history window 815 shown in FIG. 35, it is possible to set the items displayed in the upper portion of the job history window 815, as the condition for stopping or slowing down the scroll display. For example, in FIG. 35, the user name, the state, the staple (as to whether the staple is carried out or not) and the punch (as to whether the punch is carried out or not) can be selected as the condition. That is, the user name, the state, the staple and the punch are treated as the attributes of the display item. The CPU 10 determines the scroll attribute for controlling the scroll display of the list in accordance with the satisfaction situation of the predetermined condition with respect to each of the plurality of attributes. Specifically, the user name can be selected from the user name list displayed in the drop-down list of the user name combo box 820. The state can be selected from the "success" and the "failure" of the job in the state selection combo box 830. The staple can be set by checking the staple option check box 840. The punch can be set by checking the punch option check box 850.

For example, when the user wants to search the history in which the user "Sato" carried out the print, the user selects the user "Sato" from the user name combo box 820 and carries out the flick operation. When the display item (job history) of the user "Sato" reaches the specific control standard position which is previously set (for example, in case that the specific control standard position is set to the upper portion of the list control, when the display item reaches the top line of the list), the scroll display is automatically and quickly stopped.

Further, in case of the job history window 815, the scroll attribute can be set by using the above six patterns. For example, the scroll display is controlled by the fifth pattern ((Setting A) multiple determination+(Setting B) two-step control+(Setting C) stop mode), the user name "Sato" is set as the first search condition and the state "failure" is set as the second search condition. Then, the scroll display is controlled so as to stop the scroll display when the display item of the job history in which the user "Sato" carried out the job and the job was failed reaches the specific control standard position, to slow down the scroll display when the display item of the job history in which the user "Sato" carried out the job and the job was successful reaches the specific control standard position and to pass the display item of the job history in which the user "Sato" did not carry out the job through the specific control standard position without slowing down the scroll display.

As described above, in the embodiment according to the present invention, when the scroll display of the list in which the display items are listed is started and the display item which satisfies the predetermined search conditions is displayed on the screen of the operation display unit 140, the CPU 10 controls the scroll display so as to stop it or to slow down it to a slow speed which is slower than the normal speed. Therefore, when the display item in which the file has not been output or in which the job is failed is displayed on the screen of the operation display unit 140, the CPU 10 automatically stops or slows down the scroll display. The user can easily confirm the display item to be searched and can easily search and select the intended item.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the above embodiment and the first example, the constant speed flick (that is, after the flick operation, the scroll display is carried out at a constant speed) or the slowdown flick (that is, the scroll display is slowed down by simulating the friction) is applied. However, the present embodiment is not limited to this. For example, the acceleration of the flick operation may be detected, and the scroll display speed may be changed according to the detected acceleration. Further, after the scroll display is continued, the scroll display may be smoothly stopped.

In the above second example, the user selects the user name as the search condition. However, the present embodiment is not limited to this. By combining the above second example and the user authorization unit 80 of the image processing device 100, the job item related to the user name of the user who is currently authorized can be set as the search condition without positively selecting the user name. Then, the scroll display can be automatically stopped.

In the embodiment and the first example, the files stored in the USB memory are treated as ones to be output. However, the present embodiment is not limited to this. For example, the files stored in the HDD 70 of the image processing device 100, the files stored in the information processing device 200 and/or the server 300, the files communicated on the Internet 500, the files stored in a compact flash mounted on the image processing device 100, may be treated as ones to be output.

In the embodiment, the operation display device may be configured so as to enable the user to switch on/off the automatic stop function of the scroll display. For example, as shown in FIG. 25, the check box 860 for setting the switch-on/off of the scroll automatic stop function is provided in the window. Only when the check box 860 is checked, the automatic stop function (or the automatic slowdown function) of the scroll display may become effective.

In the embodiment, the scroll display of the display items are started by the flick operation of the user. However, the present embodiment is not limited to this. The scroll display of the display items or the search of the items may be started by using the operation button, such as a scroll start button, a search start button or the like, which is provided in the operation display unit 140. For example, a right direction scroll start button and a left direction scroll start button may be provided. When one of the scroll start button is operated, the scroll display is started in the direction corresponding to the operated scroll start button.

In the embodiment, the first to the sixth patterns for determining the stroll attribute, such as "stop", "slowdown" and the like are provided. However, it is not necessary to provide all of the above patterns. At least one pattern may be provided.

One of the objects of the above embodiment is to provide an operation display device, a scroll display controlling method and a tangible computer-readable recording medium, in which the intended display item can be easily searched in the scroll display.

In the above embodiment, the control unit controls the scroll display so as to set the speed of the scroll display to a slow speed which is slower than the normal speed, when the display item which satisfies the predetermined condition is displayed on the screen of the display device after the scroll display of the list in which the display items are listed is started. For example, in case that the user sets the file which has not been printed out or the file in which the job is failed, as the condition, the control unit slows down the scroll display when the display item which satisfies the condition is displayed on the screen of the display device. Therefore, the user can easily search the intended display item from the display items which are displayed by the scroll display.

Further, in the embodiment, the display item has a plurality of attributes. The condition is set with respect to each attribute of the display item. The control unit controls the scroll display in the screen in accordance with the satisfaction situation of the condition. Because the condition can be set with respect to each of the plurality of attributes, it is possible to search the display item under various conditions. For example, by combining the conditions of the attributes with each other, it is possible to control the scroll display so as to slowdown the scroll display in accordance with the combined conditions.

In the embodiment, the control unit differentiates the control for the scroll display in accordance with the satisfaction situation of the conditions. That is, the control unit differentiates the speed control for the scroll display of the display items between the case in which the display item fully satisfies the conditions and the case in which the display item partially satisfies the conditions.

In this embodiment, when the display item which fully satisfies the conditions is displayed on the screen, the scroll display is stopped. When the display item which partially satisfies the conditions is displayed on the screen, the scroll display is slowed down. When the user carries out the predetermined stop operation in the situation that the scroll display is slowed down, the scroll display is stopped. The user can confirm the display items at the slow speed and can carry out the stop operation if necessary. Further, when the user does not carry out the stop operation, the speed of the scroll display returns to the normal speed and the scroll display is continued. Therefore, the operation is easily carried out.

In the embodiment, when the display item which fully satisfies the condition is displayed on the screen, the control unit instructs the display device to display the display items so as to slow down the scroll display to the second slow speed which is slower than the first slow speed at which the scroll display is carried out when the display items which partially satisfies the condition is displayed.

In the embodiment, it is possible to select the output mode of the file among a plurality of output modes and the file is searched on the basis of the selected output mode (the current output mode). For example, in the first case, when the display item in which the file is not still output in the current output mode and the file has been already output in at least one of the other output modes, is displayed, the scroll display is slowed down. When the display item in which the file is still unoutput in all of the output modes, is displayed, the scroll display is stopped. On the other hand, in the second case, when the display item in which the file has been already output in the current mode and the file is not still output in at least one of the other output modes, is displayed, the scroll display is slowed down. When the display item in which the file has been already output in all of the output modes, is displayed, the scroll display is stopped. In the first case, when the file has been already output in the current mode, the corresponding display item is not stopped nor slowed down and the scroll display is carried out at the normal speed without depending on the other output modes. In the second case, when the file is not still output in the current mode, the corresponding display item is not stopped nor slowed down and the scroll display is carried out at the normal speed without depending on the other output modes.

In the embodiment, when the display item which fully satisfies the conditions is displayed on the screen of the display device, the control unit controls the scroll display so as to stop or slow down the scroll display. Therefore, when the intended display item to be searched is displayed on the screen, the user can easily recognize the display item which satisfies the conditions by changing the speed of the scroll display.

In the embodiment, the conditions are set as to whether the file has been already output or is still not output in each output mode. With respect to each display item, the scroll display is controlled so as to stop or slow down it depending on whether the file has been output or not in the output modes.

In the embodiment, the scroll display of the display items is started by the flick operation in which the user flicks an optional area of the screen on the display device with the user's finger.

In the embodiment, the speed control position which can be set by the user is provided in the screen. Therefore, when the display item which fully or partially satisfies the conditions reaches the set speed control position, the control unit controls the scroll display so as to stop or slow down it.

According to the operation display device, the scroll display controlling method and the tangible computer-readable recording medium which are disclosed in the above embodiment, when the display item which satisfies the condition which the user sets, is displayed on the screen, the scroll display is stopped or slowed down. Therefore, the user can easily search the intended display item.

What is claimed is:

1. An operation display device for carrying out a setting relating to an image forming device, comprising:
   a display device;
   an operating device to receive a starting operation for starting a scroll display of a list in which a plurality of files as display items are listed, on a screen of the display device, and a selection operation for selecting an output mode among a plurality of output modes for outputting at least one file from the image forming device, each display item having a plurality of attributes including attributes which respectively indicate that the file has already been output or has not yet been output in a given output mode among the plurality of output modes; and
   a processor to set a predetermined pattern for controlling the scroll display from among a plurality of predetermined patterns, the predetermined pattern indicating a relation between a speed of the scroll display and whether or not the file has already been output in one or more of the plurality of output modes, and to control the scroll display in accordance with the set predetermined pattern,
   wherein according to each of the plurality of predetermined patterns, the processor controls the scroll display based on a satisfaction situation of a predetermined condition with respect to at least one of the plurality of attributes of each display item,
   wherein according to at least one of the plurality of predetermined patterns, the processor controls the scroll display based on a satisfaction situation of a predetermined condition with respect to each of the plurality of attributes of each display item, so as to stop the scroll display or to set a speed of the scroll display so as to control the speed of the scroll display to be a slow speed which is slower than a normal speed when a display item which fully satisfies the predetermined condition is displayed on the screen after the scroll display of the list is started by receiving the starting operation, and to differentiate a control for the scroll display of a display item among the plurality of display items which fully satisfies the predetermined condition, from a control for the scroll display of a display item among the plurality of display items which partially satisfies the predetermined condition,
   wherein the normal speed is a speed at which the processor controls the scroll display at least when a display item which completely fails to satisfy the predetermined condition is displayed on the screen after the scroll display of the list is started,
   wherein the predetermined condition includes a condition whereby the file has not been output in a given output mode among the plurality of output modes,
   wherein according to said at least one of the plurality of patterns, the display item which fully satisfies the predetermined condition includes a display item having attributes which indicate that the file has not yet been output in any of the output modes, and
   wherein according to said at least one of the plurality of patterns, the display item which partially satisfies the predetermined condition includes a display item having attributes which indicate that the file has not yet been output in the selected output mode and that the file has already been output in at least one other output mode, or a display item having attributes which indicate that the file has already been output in the selected output mode and has not yet been output in at least one other output mode.

2. The operation display device of claim 1, wherein according to one of the plurality of predetermined patterns, the processor stops the scroll display when the display item which fully satisfies the predetermined condition is displayed on the screen, and the processor sets the speed of the scroll display to the slow speed when the display item which partially satisfies the predetermined condition is displayed on the screen.

3. The operation display device of claim 1, wherein according to one of the plurality of predetermined patterns, the processor sets the speed of the scroll display to a first slow speed which is slower than the normal speed, when the display item which partially satisfies the predetermined condition is displayed on the screen, and the processor sets the speed of the scroll display to a second slow speed which is slower than the first slow speed, when the display item which fully satisfies the predetermined condition is displayed on the screen.

4. The operation display device of claim 1, wherein according to at least one of the predetermined patterns, when the display item which fully satisfies the predetermined condition is displayed on the screen, the processor controls the scroll display so as to stop the scroll display or to set the speed of the scroll display to be the slow speed.

5. The operation display device of claim 1, wherein the starting operation for starting the scroll display is a flick operation in which a user flicks the screen with a user's finger.

6. The operation display device of claim 1,
wherein the operating device receives a setting operation for setting a speed control position in the screen, and
the processor controls the scroll display for a display item in accordance with the set predetermined pattern based on the satisfaction situation of the predetermined condition with respect to the plurality of attributes of the display item when the display item reaches the speed control position.

7. The operation display device of claim 1, wherein according to at least one of the predetermined patterns, the processor stops the scroll display or controls the speed of the scroll display to be the slow speed when a display item which satisfies a predetermined condition whereby the display item has attributes which indicate that the file has not yet been output in the selected output mode is displayed on the screen, and the processor controls the scroll display to be the normal speed when a display item which has attributes which indicate that the file has already been output in the selected output mode is displayed on the screen.

8. An operation display device for carrying out a setting relating to an image forming device, comprising:
a display device;
an operating device to receive a starting operation for starting a scroll display of a list in which a plurality of files as display items are listed, on a screen of the display device, and a selection operation for selecting an output mode among a plurality of output modes, for outputting at least one file from the image forming device, each display item having a plurality of attributes; and
a processor to set a predetermined pattern for controlling the scroll display from among a plurality of predetermined patterns, the predetermined pattern indicating a relation between a speed of the scroll display and whether or not the file has already been output in one or more of the plurality of output modes, and to control the scroll display in accordance with the set predetermined pattern,
wherein according to each of the plurality of predetermined patterns, the processor controls the scroll display based on a satisfaction situation of a predetermined condition with respect to at least one of the plurality of attributes of each display item, and
wherein according to at least one of the plurality of predetermined patterns, the processor controls the scroll display based on a satisfaction situation of the predetermined condition with respect to each of the plurality of attributes of each display item, so as to stop the scroll display or to control a speed of the scroll display to be a slow speed which is slower than a normal speed when a display item among the plurality of display items having a combination of attributes which satisfy a predetermined condition whereby at least one of the attributes indicates that the file has not been output in one of the output modes, is displayed on the screen after the scroll display of the list is started by receiving the starting operation,
wherein the normal speed is a speed at which the processor controls the scroll display at least when a display item having a combination of attributes which completely fail to satisfy the predetermined condition is displayed on the screen after the scroll display of the list is started.

9. The operation display device of claim 8, wherein according to at least one of the plurality of predetermined patterns, the processor differentiates a control for the scroll display of a display item among the plurality of display items having a combination of attributes which satisfy a predetermined condition whereby all of the attributes indicate that the file has not been output in given ones of the output modes, from a control for the scroll display of a display item among the plurality of the display items having a combination of attributes which satisfy a predetermined condition whereby at least one, but not all, of the attributes indicate that the file has not been output in one of the output modes.

10. The operation display device of claim 8, wherein according to one of the plurality of predetermined patterns, the processor stops the scroll display when a display item among the plurality of display items having a combination of attributes which satisfy a predetermined condition whereby all of the attributes indicate that the file has not been output in given ones of the output modes is displayed on the screen, and the processor controls the speed of the scroll display to be the slow speed when a display item among the plurality of display items having a combination of attributes which satisfy a predetermined condition whereby at least one, but not all, of the attributes indicate that the file has not been output in one of the output modes is displayed on the screen.

11. The operation display device of claim 8, wherein according to one of the plurality of predetermined patterns, the processor controls the speed of the scroll display to be a first slow speed which is slower than the normal speed when a display item among the plurality of display items having a combination of attributes which satisfy a predetermined condition whereby at least one, but not all, of the attributes indicate that the file has not been output in one of the output modes is displayed on the screen, and the processor controls the speed of the scroll display to be a second slow speed which is slower than the first slow speed, when a display item among the plurality of display items having a combination of attributes which satisfy a predetermined condition whereby all of the attributes indicate that the file has not been output in given ones of the output modes is displayed on the screen.

12. The operation display device of claim 8, wherein the starting operation for starting the scroll display is a flick operation in which a user flicks the screen with a user's finger.

13. The operation display device of claim 8, wherein the operating device receives a setting operation for setting a speed control position in the screen, and, according to at least one of the predetermined patterns, the processor stops the scroll display or controls the speed of the scroll display to be the slow speed when the display item having a combination of attributes which satisfy the predetermined condition reaches the speed control position.

14. The operation display device of claim 8, wherein according to at least one of the predetermined patterns, the processor stops the scroll display or controls the speed of the scroll display to be the slow speed when a display item among the plurality of display items which satisfies a predetermined condition whereby the display item has a combination of attributes which indicate that the file has not yet been output in the selected output mode is displayed on the screen, and the processor controls the scroll display to be the normal speed when a display item among the plurality of display items has a combination of attributes which indicate that the file has already been output in the selected output mode is displayed on the screen.

15. A scroll display controlling method for carrying out a setting relating to an image forming device on an operation display device, the method comprising:
  displaying, by control of a processor, a list in which a plurality of files as display items are listed, on a screen of the display device, each of the display items having a plurality of attributes;
  receiving, via an operating device, a starting operation for starting a scroll display of the list, and a selection operation for selecting an output mode among a plurality of output modes for outputting at least one file from the image forming device, wherein the plurality of attributes of each of the display items include attributes which respectively indicate that the file has been already output or has not yet been output in a given output mode among the plurality of output modes;
  setting, with the processor, a predetermined pattern for controlling the scroll display from among a plurality of predetermined patterns, the predetermined pattern indicating a relation between a speed of the scroll display and whether or not the file has already been output in one or more of the plurality of output modes; and
  controlling, with the processor, the scroll display in accordance with the set predetermined pattern,
  wherein according to each of the plurality of predetermined patterns, in the controlling, the processor controls the scroll display based on a satisfaction situation of a predetermined condition with respect to at least one of the plurality of attributes of each display item, and
  wherein according to at least one of the plurality of predetermined patterns, in the controlling, the processor controls the scroll display based on a satisfaction situation of a predetermined condition with respect to each of the plurality of attributes of each display item, so as to stop the scroll display or to set a speed of the scroll display so as to control the speed of the scroll display to be a slow speed which is slower than a normal speed when a display item which fully satisfies the predetermined condition is displayed on the screen of the display device after the scroll display of the list is started in accordance with the starting operation received via the operating device, and to differentiate a control for the scroll display of a display item among the plurality of display items which fully satisfies the predetermined condition, from a control for the scroll display of a display item among the plurality of display items which partially satisfies the predetermined condition,
  wherein the normal speed is a speed at which the processor controls the scroll display at least when a display item which completely fails to satisfy the predetermined condition is displayed on the screen after the scroll display of the list is started,
  wherein the predetermined condition includes a condition whereby the file has not been output in a given output mode among the plurality of output modes,
  wherein according to said at least one of the plurality of patterns, the display item which fully satisfies the predetermined condition includes a display item having attributes which indicate that the file has not yet been output in any of the output modes, and
  wherein according to said at least one of the plurality of patterns, the display item which partially satisfies the predetermined condition includes a display item having attributes which indicate that the file has not yet been output in the selected output mode and that the file has already been output in at least one other output mode, or a display item having attributes which indicate that the file has already been output in the selected output mode and has not yet been output in at least one other output mode.

16. The scroll display controlling method of claim 15, wherein according to at least one of the predetermined patterns, in the controlling, the processor stops the scroll display or controls the speed of the scroll display to be the slow speed when a display item which satisfies a predetermined condition whereby the display item has attributes which indicate that the file has not yet been output in the selected output mode is displayed on the screen, and the processor controls the scroll display to be the normal speed when a display item which has attributes which indicate that the file has already been output in the selected output mode is displayed on the screen.

17. A scroll display controlling method for carrying out a setting relating to an image forming device on an operation display device, the method comprising:
  displaying, by control of a processor, a list in which a plurality of files as display items are listed, on a screen of the display device, each display item having a plurality of attributes;
  receiving, via an operating device, a starting operation for starting a scroll display of the list, and a selection operation for selecting an output mode among a plurality of output modes, for outputting at least one file from the image forming device;
  setting, with the processor, a predetermined pattern for controlling the scroll display from among a plurality of predetermined patterns, the predetermined pattern indicating a relation between a speed of the scroll display and whether or not the file has already been output in one or more of the plurality of output modes; and
  controlling, with the processor, the scroll display in accordance with the set predetermined pattern,
  wherein according to each of the plurality of predetermined patterns, in the controlling, the processor controls the scroll display based on a satisfaction situation of a predetermined condition with respect to at least one of the plurality of attributes of each display item, and
  wherein according to at least one of the plurality of predetermined patterns, in the controlling, the processor controls the scroll display based on a satisfaction situation of a predetermined condition with respect to each of the plurality of attributes of each display item, so as to stop the scroll display or to control a speed of the scroll display to be a slow speed which is slower than a normal speed when a display item among the plurality of display items having a combination of attributes which satisfy a predetermined condition whereby at least one of the attributes indicates that the file has not been output in one of the output modes, is displayed on the screen after the scroll display of the list is started in accordance with the starting operation received via the operating device, wherein the normal speed is a speed at which the processor controls the scroll display at least when a display item having a combination of attributes which completely fail to satisfy the predetermined condition is displayed on the screen after the scroll display of the list is started.

18. The scroll display controlling method of claim 17, wherein according to at least one of the plurality of predetermined patterns, in the controlling, the processor differentiates a control for the scroll display of a display item among the plurality of display items having a combination of attributes which satisfy a predetermined condition whereby all of the attributes indicate that the file has not been output in given ones of the output modes, from a control for the scroll display of a display item among the plurality of the display items having a combination of attributes which satisfy a predetermined condition whereby at least one, but not all, of the attributes indicate that the file has not been output in one of the output modes.

19. The scroll display controlling method of claim 17, wherein according to at least one of the predetermined patterns, in the controlling, the processor stops the scroll display or controls the speed of the scroll display to be the slow speed when a display item among the plurality of display items which satisfies a predetermined condition whereby the display item has a combination of attributes which indicate that the file has not yet been output in the selected output mode is displayed on the screen, and the processor controls the scroll display to be the normal speed when a display item among the plurality of display items has a combination of attributes which indicate that the file has already been output in the selected output mode is displayed on the screen.

\* \* \* \* \*